US012509337B2

(12) United States Patent
Tinker et al.

(10) Patent No.: US 12,509,337 B2
(45) Date of Patent: Dec. 30, 2025

(54) STEERING SHAFT ASSEMBLY FOR A MATERIALS HANDLING VEHICLE

(71) Applicant: Crown Equipment Corporation, New Bremen, OH (US)

(72) Inventors: John Tinker, Greenville, NC (US); Clinton Reges, Greenville, NC (US)

(73) Assignee: Crown Equipment Corporation, New Bremen, OH (US)

( * ) Notice: Subject to any disclaimer, the term of this patent is extended or adjusted under 35 U.S.C. 154(b) by 462 days.

(21) Appl. No.: 18/299,764

(22) Filed: Apr. 13, 2023

(65) Prior Publication Data

US 2024/0343541 A1 Oct. 17, 2024

(51) Int. Cl.
B66F 9/075 (2006.01)

(52) U.S. Cl.
CPC .................. B66F 9/07568 (2013.01)

(58) Field of Classification Search
CPC ............. B62D 5/04; B66F 9/07568
See application file for complete search history.

(56) References Cited

U.S. PATENT DOCUMENTS

| 2,417,850 | A | 3/1947 | Winslow |
| 2,575,360 | A | 11/1951 | Rabinow |
| 2,645,297 | A | 7/1953 | Wennberg et al. |
| 2,886,151 | A | 5/1959 | Winslow |
| 3,332,507 | A | 7/1967 | Bush |
| 3,720,281 | A | 3/1973 | Frownfelter |
| 3,791,474 | A | 2/1974 | Stammen et al. |
| 3,946,825 | A | 3/1976 | Gail |
| 4,028,597 | A | 6/1977 | Delaney et al. |
| 4,223,901 | A | 9/1980 | Klemick |
| 4,287,966 | A | 9/1981 | Frees |
| 4,336,860 | A | 6/1982 | Noller et al. |

(Continued)

FOREIGN PATENT DOCUMENTS

| CA | 2346604 A1 | 11/2001 |
| CN | 1736752 A | 2/2006 |

(Continued)

OTHER PUBLICATIONS

Crown Equipment Corporation; GPC 3000 Parts Manual [5A416980-5A999999], Rev. 4, Nov. 2018; pp. 1, 131-136, 221-224.

(Continued)

Primary Examiner — Karen Beck
(74) Attorney, Agent, or Firm — Stevens & Showalter LLP

(57) ABSTRACT

A steering shaft assembly including an adapter plate; a steer housing spaced apart from and secured to the adapter plate and including a boss extending toward the adapter plate; a bearing secured within the boss; a steering shaft coupled to the bearing to allow rotation about a steering axis; and one or more friction and/or spring discs positioned about the steering shaft between the shoulder and the bearing, in which the steering shaft includes a shoulder extending outwardly from an outer surface of a main body and positioned between the adapter plate and an upper surface of the boss. The shoulder and the bearing exert a load on the one or more friction and/or spring discs such that the one or more friction and/or spring discs provide a constant steering resistance. The steering shaft assembly may include a spacer that is configured to redirect condensation.

18 Claims, 16 Drawing Sheets

(56) References Cited

U.S. PATENT DOCUMENTS

| | | |
|---|---|---|
| 4,354,568 A | 10/1982 | Griesenbrock |
| 4,386,674 A | 6/1983 | Sugata |
| 4,392,670 A | 7/1983 | Schultz |
| 4,500,818 A | 2/1985 | Konrad et al. |
| 4,520,299 A | 5/1985 | Konrad |
| 4,588,198 A | 5/1986 | Kanazawa et al. |
| 4,716,980 A | 1/1988 | Butler |
| 4,771,846 A | 9/1988 | Venable et al. |
| 4,815,329 A | 3/1989 | Ansgar et al. |
| 4,834,203 A | 5/1989 | Takahashi et al. |
| 4,860,844 A | 8/1989 | O'Neil |
| 4,871,040 A | 10/1989 | Zuraski et al. |
| 4,886,138 A | 12/1989 | Graber et al. |
| 4,936,425 A | 6/1990 | Boone et al. |
| 4,942,529 A | 7/1990 | Avitan et al. |
| 4,950,126 A | 8/1990 | Fabiano et al. |
| 4,992,190 A | 2/1991 | Shtarkman |
| 5,029,823 A | 7/1991 | Hodgson et al. |
| 5,032,994 A | 7/1991 | Wellman |
| 5,067,576 A | 11/1991 | Bober |
| 5,097,917 A | 3/1992 | Serizawa et al. |
| 5,151,860 A | 9/1992 | Taniguchi et al. |
| 5,167,850 A | 12/1992 | Shtarkman |
| 5,181,173 A | 1/1993 | Avitan |
| 5,194,851 A | 3/1993 | Kraning et al. |
| 5,247,441 A | 9/1993 | Serizawa et al. |
| 5,251,135 A | 10/1993 | Serizawa et al. |
| 5,277,281 A | 1/1994 | Carlson et al. |
| 5,284,330 A | 2/1994 | Carlson et al. |
| 5,293,952 A | 3/1994 | Ledamoisel et al. |
| 5,299,648 A | 4/1994 | Watanabe et al. |
| 5,315,295 A | 5/1994 | Fujii |
| 5,325,935 A | 7/1994 | Hirooka et al. |
| 5,347,458 A | 9/1994 | Serizawa et al. |
| 5,354,488 A | 10/1994 | Shtarkman et al. |
| 5,390,756 A | 2/1995 | Yokoyama |
| 5,428,537 A | 6/1995 | Kamono et al. |
| 5,457,632 A | 10/1995 | Tagawa et al. |
| 5,469,947 A | 11/1995 | Anzai et al. |
| 5,492,312 A | 2/1996 | Carlson |
| 5,517,096 A | 5/1996 | Shtarkman et al. |
| 5,539,397 A | 7/1996 | Asanuma et al. |
| 5,549,837 A | 8/1996 | Ginder et al. |
| 5,573,088 A | 11/1996 | Daniels |
| 5,576,956 A | 11/1996 | Ashizawa et al. |
| 5,579,228 A | 11/1996 | Kimbrough |
| 5,579,863 A | 12/1996 | Nelson et al. |
| 5,598,908 A | 2/1997 | York et al. |
| 5,620,071 A | 4/1997 | Ishikawa et al. |
| 5,652,704 A | 7/1997 | Catanzarite |
| 5,657,524 A | 8/1997 | Kubala |
| 5,694,313 A | 12/1997 | Ooiwa |
| 5,721,566 A | 2/1998 | Rosenberg et al. |
| 5,732,791 A | 3/1998 | Pinkos et al. |
| 5,771,989 A | 6/1998 | Sangret |
| 5,779,013 A | 7/1998 | Bansbach |
| 5,835,870 A | 11/1998 | Kagawa |
| 5,842,547 A | 12/1998 | Carlson et al. |
| 5,845,753 A | 12/1998 | Bansbach |
| 5,908,457 A | 6/1999 | Higashira et al. |
| 5,927,428 A | 7/1999 | Nagao et al. |
| 5,947,238 A | 9/1999 | Jolly et al. |
| 5,948,029 A | 9/1999 | Straetker |
| 5,950,518 A | 9/1999 | Pfeifer |
| 5,964,313 A | 10/1999 | Guy |
| 6,000,490 A | 12/1999 | Easton |
| 6,000,662 A | 12/1999 | Todeschi et al. |
| 6,041,882 A | 3/2000 | Bohner et al. |
| 6,059,068 A | 5/2000 | Kato et al. |
| 6,070,515 A | 6/2000 | Urbach |
| 6,070,681 A | 6/2000 | Catanzarite et al. |
| 6,070,691 A | 6/2000 | Evans |
| 6,079,513 A | 6/2000 | Nishizaki et al. |
| 6,082,482 A | 7/2000 | Kato et al. |
| 6,089,344 A | 7/2000 | Baughn et al. |
| 6,091,214 A | 7/2000 | Yamawaki et al. |
| 6,097,286 A | 8/2000 | Discenzo |
| 6,112,845 A | 9/2000 | Oyama et al. |
| 6,112,846 A | 9/2000 | Mukai et al. |
| 6,116,372 A | 9/2000 | Mukai et al. |
| 6,138,788 A | 10/2000 | Bohner et al. |
| 6,202,806 B1 | 3/2001 | Sandrin et al. |
| 6,219,604 B1 | 4/2001 | Dilger et al. |
| 6,227,320 B1 | 5/2001 | Eggert et al. |
| 6,234,060 B1 | 5/2001 | Jolly |
| 6,256,566 B1 | 7/2001 | Kamiya et al. |
| 6,262,712 B1 | 7/2001 | Osborne et al. |
| 6,271,828 B1 | 8/2001 | Rosenberg et al. |
| 6,279,952 B1 | 8/2001 | Wynsberghe et al. |
| 6,283,859 B1 | 9/2001 | Carlson et al. |
| 6,290,010 B1 | 9/2001 | Roudet et al. |
| 6,300,936 B1 | 10/2001 | Braun et al. |
| 6,302,249 B1 | 10/2001 | Jolly et al. |
| 6,310,604 B1 | 10/2001 | Furusho et al. |
| 6,339,419 B1 | 1/2002 | Jolly et al. |
| 6,360,151 B1 | 3/2002 | Suzuki et al. |
| 6,370,459 B1 | 4/2002 | Phillips |
| 6,370,460 B1 | 4/2002 | Kaufmann et al. |
| 6,373,465 B2 | 4/2002 | Jolly et al. |
| 6,378,671 B1 | 4/2002 | Carlson |
| 6,382,604 B2 | 5/2002 | Clair |
| 6,389,343 B1 | 5/2002 | Hefner et al. |
| 6,448,728 B2 | 9/2002 | Noro et al. |
| 6,464,025 B1 | 10/2002 | Koeper et al. |
| 6,475,404 B1 | 11/2002 | Carlson |
| 6,484,838 B1 | 11/2002 | Børsting et al. |
| 6,486,872 B2 | 11/2002 | Rosenberg et al. |
| 6,491,122 B2 | 12/2002 | Leitner et al. |
| 6,505,703 B2 | 1/2003 | Stout et al. |
| 6,507,164 B1 | 1/2003 | Healey et al. |
| 6,535,806 B2 | 3/2003 | Millsap et al. |
| 6,547,043 B2 | 4/2003 | Card |
| 6,550,565 B2 | 4/2003 | Thomas et al. |
| 6,557,662 B1 | 5/2003 | Andonian et al. |
| 6,564,897 B2 | 5/2003 | Dammeyer |
| 6,595,306 B2 | 7/2003 | Trego et al. |
| 6,609,052 B2 | 8/2003 | Radamis et al. |
| 6,612,392 B2 | 9/2003 | Park et al. |
| 6,612,929 B2 | 9/2003 | Fujimoto et al. |
| 6,619,444 B2 | 9/2003 | Menjak et al. |
| 6,625,530 B1 | 9/2003 | Bolourchi |
| 6,636,197 B1 | 10/2003 | Goldenberg et al. |
| 6,637,558 B2 | 10/2003 | Oliver et al. |
| 6,640,940 B2 | 11/2003 | Carlson |
| 6,655,490 B2 | 12/2003 | Andonian et al. |
| 6,655,494 B2 | 12/2003 | Menjak et al. |
| 6,659,218 B2 | 12/2003 | Thomas et al. |
| 6,678,595 B2 | 1/2004 | Zheng et al. |
| 6,681,881 B2 | 1/2004 | Andonian et al. |
| 6,681,882 B2 | 1/2004 | Zheng et al. |
| 6,688,420 B2 | 2/2004 | Zheng et al. |
| 6,705,424 B2 | 3/2004 | Ogawa et al. |
| 6,736,234 B2 | 5/2004 | Zheng et al. |
| 6,752,039 B2 | 6/2004 | Kreuzer et al. |
| 6,752,425 B2 | 6/2004 | Loh et al. |
| 6,757,601 B1 | 6/2004 | Yao et al. |
| 6,761,243 B2 | 7/2004 | Stout et al. |
| 6,776,249 B2 | 8/2004 | Fortin |
| 6,799,654 B2 | 10/2004 | Menjak et al. |
| 6,817,437 B2 | 11/2004 | Magnus et al. |
| 6,854,573 B2 | 2/2005 | Jolly et al. |
| 6,883,625 B2 | 4/2005 | Trego et al. |
| 6,899,196 B2 | 5/2005 | Husain et al. |
| 6,910,699 B2 | 6/2005 | Cherney et al. |
| 6,912,831 B2 | 7/2005 | Velke et al. |
| 6,920,753 B2 | 7/2005 | Namuduri |
| 6,957,873 B2 | 10/2005 | Wanke et al. |
| 6,962,231 B2 | 11/2005 | Carlsson et al. |
| 6,968,262 B2 | 11/2005 | Higashi et al. |
| 6,997,763 B2 | 2/2006 | Kaji |
| 6,999,862 B2 | 2/2006 | Tamaizumi et al. |
| 7,017,689 B2 | 3/2006 | Gilliland et al. |
| 7,025,157 B2 | 4/2006 | Lindsay et al. |
| 7,040,427 B2 | 5/2006 | Toomey |

(56) References Cited

U.S. PATENT DOCUMENTS

| | | |
|---|---|---|
| 7,113,166 B1 | 9/2006 | Rosenberg et al. |
| 7,165,643 B2 | 1/2007 | Bozem et al. |
| 7,178,613 B2 | 2/2007 | Yanaka et al. |
| 7,207,411 B2 | 4/2007 | Duits et al. |
| 7,213,678 B2 | 5/2007 | Park |
| 7,226,069 B2 | 6/2007 | Ueda et al. |
| 7,234,563 B2 | 6/2007 | Ogawa et al. |
| 7,240,485 B2 | 7/2007 | Namuduri et al. |
| 7,257,947 B2 | 8/2007 | Namuduri |
| 7,302,329 B2 | 11/2007 | McDonald et al. |
| 7,353,099 B2 | 4/2008 | Lindsay et al. |
| 7,706,947 B2 | 4/2010 | Bozem et al. |
| 7,720,584 B2 | 5/2010 | Ogawa et al. |
| 7,831,355 B2 | 11/2010 | Nishiyama |
| 7,849,955 B2 | 12/2010 | Crabill et al. |
| 7,980,352 B2 | 7/2011 | Wetterer et al. |
| 8,172,033 B2 | 5/2012 | Corbett et al. |
| 8,412,431 B2 | 4/2013 | Wetterer et al. |
| 8,718,890 B2 | 5/2014 | Wetterer et al. |
| 8,855,859 B2 | 10/2014 | Hayama |
| 9,421,963 B2 | 8/2016 | Wetterer et al. |
| 10,894,557 B2 | 1/2021 | Utsunomiya et al. |
| 2001/0042655 A1 | 11/2001 | Dammeyer |
| 2001/0052756 A1 | 12/2001 | Noro et al. |
| 2002/0074179 A1 | 6/2002 | Brandt et al. |
| 2002/0079157 A1 | 6/2002 | Song |
| 2002/0087242 A1 | 7/2002 | Kawashima |
| 2002/0095224 A1 | 7/2002 | Braun et al. |
| 2003/0028306 A1 | 2/2003 | Fujimori |
| 2003/0029648 A1 | 2/2003 | Trego et al. |
| 2003/0079923 A1 | 5/2003 | Johnson |
| 2003/0114270 A1 | 6/2003 | Wuertz et al. |
| 2003/0168275 A1 | 9/2003 | Sakugawa |
| 2004/0046346 A1 | 3/2004 | Eki et al. |
| 2004/0099453 A1 | 5/2004 | Guy |
| 2004/0104066 A1 | 6/2004 | Sakai |
| 2004/0231902 A1 | 11/2004 | Carlson et al. |
| 2005/0016779 A1 | 1/2005 | Lindsay et al. |
| 2005/0023066 A1 | 2/2005 | McGoldrick |
| 2005/0055149 A1 | 3/2005 | Kato et al. |
| 2005/0087384 A1 | 4/2005 | Magnus et al. |
| 2005/0199436 A1 | 9/2005 | Schroder et al. |
| 2005/0247508 A1 | 11/2005 | Gilliland et al. |
| 2005/0281656 A1 | 12/2005 | Bozem et al. |
| 2006/0006027 A1 | 1/2006 | Carlson et al. |
| 2006/0089778 A1 | 4/2006 | Lindsay et al. |
| 2006/0090967 A1 | 5/2006 | Bernd et al. |
| 2006/0169499 A1 | 8/2006 | Gotz |
| 2006/0178799 A1 | 8/2006 | Hoying |
| 2006/0197741 A1 | 9/2006 | Biggadike |
| 2006/0200291 A1 | 9/2006 | Wroblewski |
| 2006/0225947 A1 | 10/2006 | Nyberg |
| 2006/0231301 A1 | 10/2006 | Rose et al. |
| 2006/0231302 A1 | 10/2006 | Rose |
| 2006/0245866 A1 | 11/2006 | Rose et al. |
| 2006/0259221 A1 | 11/2006 | Murty et al. |
| 2006/0260877 A1 | 11/2006 | Ito et al. |
| 2007/0013655 A1 | 1/2007 | Rosenberg et al. |
| 2007/0080025 A1 | 4/2007 | Yamada et al. |
| 2007/0080037 A1 | 4/2007 | Larry et al. |
| 2007/0095040 A1 | 5/2007 | Berkeley |
| 2007/0096557 A1 | 5/2007 | Tamai et al. |
| 2007/0137904 A1 | 6/2007 | Rose et al. |
| 2007/0257552 A1 | 11/2007 | Hehl |
| 2007/0278032 A1 | 12/2007 | Sakaguchi et al. |
| 2008/0164087 A1 | 7/2008 | Koyama et al. |
| 2009/0194357 A1 | 8/2009 | Wetterer et al. |
| 2009/0194358 A1 | 8/2009 | Corbett et al. |
| 2009/0194363 A1 | 8/2009 | Crabill et al. |
| 2009/0198416 A1 | 8/2009 | Wetterer et al. |
| 2009/0222168 A1 | 9/2009 | Egenfeldt |
| 2010/0063682 A1 | 3/2010 | Akaki |
| 2022/0136918 A1 | 5/2022 | Frachon |

FOREIGN PATENT DOCUMENTS

| | | | | |
|---|---|---|---|---|
| CN | 101263040 A | * | 9/2008 | ............ B62D 5/008 |
| CN | 202669907 U | | 1/2013 | |
| CN | 109073047 A | * | 12/2018 | ............ F16H 1/2863 |
| DE | 3830836 A1 | | 3/1990 | |
| DE | 19510717 C2 | | 1/1997 | |
| DE | 19901451 A1 | | 7/2000 | |
| DE | 10033107 A1 | | 1/2001 | |
| DE | 102005011998 A1 | | 10/2005 | |
| DE | 102005012004 A1 | | 10/2005 | |
| DE | 602004009363 T2 | | 3/2008 | |
| DE | 102010040739 A1 | | 3/2012 | |
| DE | 102018205056 A1 | | 10/2019 | |
| DE | 102018115650 A1 | | 1/2020 | |
| DE | 102020122302 A1 | * | 3/2022 | ............ B62D 5/006 |
| EP | 0389669 A1 | | 10/1990 | |
| EP | 0442570 A1 | | 8/1991 | |
| EP | 0872405 A2 | | 10/1998 | |
| EP | 0726193 A2 | | 5/1999 | |
| EP | 1013537 A2 | | 6/2000 | |
| EP | 1125825 A2 | | 8/2001 | |
| EP | 1481944 A2 | | 12/2004 | |
| EP | 1505034 A2 | | 2/2005 | |
| EP | 1655211 A2 | | 5/2006 | |
| EP | 1690775 A1 | * | 8/2006 | ............... B66F 9/20 |
| EP | 1475297 B8 | | 10/2007 | |
| EP | 1533211 B1 | | 10/2007 | |
| EP | 1690775 B1 | | 1/2008 | |
| EP | 1655202 B1 | | 4/2009 | |
| EP | 2565149 A1 | | 3/2013 | |
| EP | 2244966 B1 | | 11/2014 | |
| GB | 649553 A | | 1/1951 | |
| GB | 2087513 A | | 5/1982 | |
| GB | 2263179 A | | 7/1993 | |
| GB | 2310413 A | | 8/1997 | |
| GB | 2351953 A | | 1/2001 | |
| GB | 2378165 A | | 2/2003 | |
| GB | 2404179 A | | 1/2005 | |
| GB | 2399325 B | | 5/2006 | |
| JP | 57120730 A | | 7/1982 | |
| JP | 60080969 A | | 5/1985 | |
| JP | 61070617 A | | 4/1986 | |
| JP | 61196863 A | | 9/1986 | |
| JP | 39759 | | 11/1986 | |
| JP | 61275059 A | | 12/1986 | |
| JP | 62198564 A | | 9/1987 | |
| JP | 63082873 | | 4/1988 | |
| JP | 1131348 A | | 5/1989 | |
| JP | 2120527 A | | 5/1990 | |
| JP | 02212272 A | | 8/1990 | |
| JP | 04108071 A | | 4/1992 | |
| JP | 04133860 A | | 5/1992 | |
| JP | 4357312 A | | 12/1992 | |
| JP | 4358967 A | | 12/1992 | |
| JP | 4372471 A | | 12/1992 | |
| JP | 06087453 | | 3/1994 | |
| JP | 06092246 | | 4/1994 | |
| JP | 6107026 A | | 4/1994 | |
| JP | 06255522 A | | 9/1994 | |
| JP | 07165091 A | | 6/1995 | |
| JP | 07269604 A | | 10/1995 | |
| JP | H08117588 A | | 5/1996 | |
| JP | H08127790 A | | 5/1996 | |
| JP | 08253159 A | | 10/1996 | |
| JP | 08277853 A | | 10/1996 | |
| JP | 08292712 A | | 11/1996 | |
| JP | 08337171 A | | 12/1996 | |
| JP | 09142330 A | | 6/1997 | |
| JP | 09226607 A | | 9/1997 | |
| JP | 10171542 A | | 6/1998 | |
| JP | 10177378 A | | 6/1998 | |
| JP | 10184758 A | | 7/1998 | |
| JP | 10217998 A | | 8/1998 | |
| JP | 10226346 A | | 8/1998 | |
| JP | 10250617 A | | 9/1998 | |
| JP | 10297519 A | | 11/1998 | |
| JP | 10307661 A | | 11/1998 | |
| JP | 11132259 A | | 5/1999 | |

(56) References Cited

FOREIGN PATENT DOCUMENTS

| | | | |
|---|---|---|---|
| JP | 2914165 B2 | 6/1999 | |
| JP | 11255134 A | 9/1999 | |
| JP | 11513192 A | 11/1999 | |
| JP | 2000072399 A | 3/2000 | |
| JP | 200181618 | 6/2000 | |
| JP | 2001352612 A | 12/2001 | |
| JP | 2003306160 A | 10/2003 | |
| JP | 2004090758 A | 3/2004 | |
| JP | 2004140908 A | 5/2004 | |
| JP | 2005096894 A | 4/2005 | |
| JP | 2005170136 A | 6/2005 | |
| JP | 2007130309 A * | 5/2007 | ......... A61B 1/00042 |
| JP | 2007168617 A | 7/2007 | |
| JP | 5464999 B2 | 4/2014 | |
| KR | 20020044975 A | 6/2002 | |
| KR | 20040096679 A | 11/2004 | |
| KR | 20140066338 A | 6/2014 | |
| KR | 101538174 B1 | 7/2015 | |
| WO | 09642078 | 12/1996 | |
| WO | 9715058 A1 | 4/1997 | |
| WO | 9926230 A1 | 5/1999 | |
| WO | 03010040 A1 | 2/2003 | |
| WO | 2006113510 A2 | 10/2006 | |
| WO | 2007106714 A2 | 9/2007 | |
| WO | 2009099803 A1 | 8/2009 | |
| WO | 2009099806 A1 | 8/2009 | |
| WO | 2009142781 A1 | 11/2009 | |

OTHER PUBLICATIONS

Crown Equipment Corporation; GPC 3000 Service Manual, (please see the cover letter submitted with this Information Disclosure Statement regarding the publication date); pp. 1, 63, 68, 77, 104, 106-107, 116, 163, 218, 220-221, 250-253, 276-287, 322-325, 332-347, 452, 468.
Rupcic, Zoran; International Search Report and Written Opinion of the International Searching Authority; International Application No. PCT/US2009/032135; May 13, 2009; European Patent Office.
Rupcic, Zoran; International Search Report and Written Opinion of the International Searching Authority; International Application No. PCT/US2009/032146; May 18, 2009; European Patent Office.
Rupcic, Zoran; International Search Report and Written Opinion of the International Searching Authority; International Application No. PCT/US2009/032141; May 19, 2009; European Patent Office.
Leroy, Douglas F.; MR Technology, Tactile Feedback and Application of By-Wire Systems; Equipment Technology; Utility & Telecom Fleets; May 2007; pp. 35-38.
Leroy, Douglas F; Steer-by-Wire Hydraulics; Machine Design.com; Aug. 10, 2006.
Zheng, Bing; Fault Tolerant Steer-by-Wire Road Wheel Control System; 2005 American Control Conference; Jun. 8-10, 2005; pp. 1619-1624; Portland, OR.
Crown Equipment Corporation; PE 4000 PE 45000 Series; 2006; New Bremen, OH.
Crown Equipment Corporation; PC 3600 Series; 2005; New Bremen, OH.
Tactile Feedback Devices for Steer-by-Wire; pp. 22-29.
D. Carlson et al.; Magneto-Rheological Technology and Applications; 2007; pp. 1-28; Lord Corporation; Lord France.
Sharke, Paul; Tip-proofing; a forklift maker takes control of the wheel; Mechanical Engineering-CIME; Mar. 1, 2005.
Potter, Wesley A.; Non-Final Office Action; U.S. Appl. No. 12/360,413; Mar. 29, 2011; U.S. Patent and Trademark Office; Alexandria, VA.
Do, Truc M.; Non-Final Office Action; U.S. Appl. No. 12/360,353; Sep. 21, 2011; U.S. Patent and Trademark Office; Alexandria, VA.
Do, Truc M.; Non-final Office Action; U.S. Appl. No. 13/788,683; Jul. 19, 2013; U.S. Patent and Trademark Office; Alexandria, VA.
Potter, Wesley A.; Final Office Action; U.S. Appl. No. 12/360,413; Oct. 11, 2011; U.S. Patent and Trademark Office; Alexandria, VA.
Do, Truc M.; Final Office Action; U.S. Appl. No. 12/360,353; Jun. 13, 2012; U.S. Patent and Trademark Office; Alexandria, VA.
Do, Truc M.; Advisory Action; U.S. Appl. No. 12/360,353; Oct. 4, 2012; U.S. Patent and Trademark Office; Alexandria, VA.
Do, Truc M.; Office Action Summary; U.S. Appl. No. 13/788,683; Jun. 17, 2013; U.S. Patent and Trademark Office; Alexandria, VA.
Adams, Tashiana R.; Notice of Allowance and Fees Due; U.S. Appl. No. 12/360,385; Aug. 31, 2010; U.S. Patent and Trademark Office; Alexandria, VA.
Adams, Tashiana R.; Notice of Allowance and Fees Due; U.S. Appl. No. 12/360,297; Jan. 31, 2011; U.S. Patent and Trademark Office; Alexandria, VA.
Adams, Tashiana R.; Notice of Allowance and Fees Due; U.S. Appl. No. 12/360,297; May 17, 2011; U.S. Patent and Trademark Office; Alexandria, VA.
Potter, Wesley A.; Notice of Allowance and Fees Due; U.S. Appl. No. 12/360,413; Jan. 23, 2012; U.S. Patent and Trademark Office; Alexandria, VA.
Do, Truc M.; Notice of Allowance and Fees Due and Examiner's remarks; U.S. Appl. No. 12/360,353; Nov. 19, 2012; U.S. Patent and Trademark Office; Alexandria, VA.
Do, Truc M.; Notice of Allowance and Fees Due, Notice of Allowability and Examiner's Amendment; U.S. Appl. No. 13/788,683; Feb. 27, 2014; U.S. Patent and Trademark Office; Alexandria, VA.
Batley, Matthew; Patent Examination Report No. 1; Australian Patent Application No. 2009249562; Apr. 2, 2014; IP Australia; Australia.
Batley, Matthew; Patent Examination Report No. 2; Australian Patent Application No. 2009249562; Apr. 17, 2015; IP Australia; Australia.
Hackworth, Joshua; Examination Report No. 1; Australian Patent Appliction No. 2015218462; Mar. 11, 2016; Australian Patent Office; Woden, ACT; Australia.
Menyhart, Steven A .; Office Action; Canadian Application No. 2,714,019; Mar. 4, 2015; Canadian Intellectual Property Office, Canada.
Bo, Gao; First Office Action and Search Report for Chinese Patent Application No. CN200980109264.8; including a translation of the text portion of the Office Action; dated Nov. 5, 2012; State Intellectual Property Office of the People's Republic of China.
Bo, Gao; Second Office Action and Search Report for Chinese Patent Application No. CN200980109264.8; including a translation of the text portion of the Office Action; dated Jul. 15, 2013; State Intellectual Property Office of the People's Republic of China.
Office Action for Chinese Patent Application No. CN200980109264. 8; dated Apr. 3, 2014; State Intellectual Property Office of the People's Republic of China.
Patent Grant for Chinese Patent Application No. CN 200980109264. 8; Sep. 4, 2014; State Intellectual Property Office of the People's Republic of China.
First Office Action; Chinese Patent Application No. 201410251026. 3; dated Oct. 10, 2015; State Intellectual Property Office of the People's Republic of China.
Rupcic, Zoran; Communication pursuant to Article 94(3) EPC; European Patent Application No. 09751012.7; dated May 3, 2012; European Patent Office; Rijswijk, Netherlands.
Rupcic, Zoran; Communication pursuant to Article 94(3) EPC; European Patent Application No. 09751012.7; dated Dec. 17, 2013; European Patent Office; Rijswijk, Netherlands.
Rupcic, Zoran; Communication pursuant to Article 94(3) EPC; European Patent Application No. 09751012.7; dated Feb. 17, 2015; European Patent Office; Rijswijk, Netherlands.
Do, Truc M.; Notice of Allowance dated Apr. 26, 2016; U.S. Appl. No. 14/243,384; United States Patent and Trademark Office; Alexandria, Virginia.
Do, Truc M.; Final Office Action dated Jan. 15, 2016; U.S. Appl. No. 14/243,384; United States Patent and Trademark Office; Alexandria, Virginia.
Do, Truc M.; Non-Final Office Action dated Jul. 2, 2015; U.S. Appl. No. 14/243,384; United States Patent and Trademark Office; Alexandria, Virgina.

* cited by examiner

STEERING SHAFT ASSEMBLY FOR A MATERIALS HANDLING VEHICLE

TECHNICAL FIELD

The present invention relates to a materials handling vehicle having a steering shaft assembly and more specifically to such a vehicle having a steering shaft assembly capable of providing a constant steering resistance and redirecting condensation entering the steering shaft assembly.

BACKGROUND

Many steer-by-wire systems for materials handling vehicles include steering systems that provide a variable steering resistance. However, these steering systems are often complex and may periodically fail to function properly. In addition, while these steering systems are often closed, condensation or other liquid may still enter the system, which can cause the system to lock up in freezing temperatures and can also lead to corrosion and other damage to the components.

SUMMARY

In accordance with a first aspect of the present disclosure, a steering shaft assembly is provided, the steering shaft assembly including: an adapter plate; a steer housing spaced apart from and secured to the adapter plate, the steer housing comprising a boss extending toward the adapter plate; a bearing secured within the boss to prevent axial movement of the bearing; a steering shaft coupled to the bearing to allow rotation about a steering axis; and at least one of a friction disc or a spring disc positioned about the steering shaft between the shoulder and the bearing. The steering shaft includes a first end, a main body, and a shoulder, in which the first end extends through an opening in the adapter plate and is adapted to be secured to a steering control device and in which the shoulder extends outwardly from an outer surface of the main body and is positioned between the adapter plate and an upper surface of the boss. The shoulder and the bearing exert a load on the at least one friction disc or spring disc, and the at least one friction disc or spring disc provides a constant steering resistance upon rotation of the steering shaft about the steering axis.

The at least one friction disc or spring disc may include a first friction disc, a second friction disc, and a spring disc, in which the spring disc may be positioned between the first and second friction discs and in which the shoulder and the bearing may compress the first and second friction discs and the spring disc to provide the constant steering resistance.

The shoulder may be fixedly coupled to the main body of the steering shaft.

The steering shaft assembly may further include a steering angle sensor associated with a second end of the steering shaft, the steering angle sensor being configured to detect angular displacement of the steering shaft about the steering axis. In one example, the second end of the steering shaft may be configured to receive a sensor assembly comprising a magnetic material, in which the steering angle sensor comprises a Hall-effect sensor configured to determine a steering angle based on sensing of a magnetic field generated by the magnetic material as the steering shaft rotates about the steering axis. The steering shaft assembly may further include a sensor housing secured to the steer housing and configured to receive the Hall-effect sensor. In another example, the steering angle sensor may be a potentiometer.

The steering shaft may be coupled to the bearing by a friction fit between the outer surface of the steering shaft and an inner surface of the bearing.

A second end of the steering shaft may include a threaded portion configured to receive a fastener, in which the steering shaft is coupled to the bearing by a clamp load applied between the fastener and a retention shoulder formed on the steering shaft when the second end of the steering shaft extends through the bearing and the threaded portion is coupled to the fastener.

In accordance with a second aspect of the present disclosure, a steering shaft assembly is provided, the steering shaft assembly including: a steering control device; and a steering shaft assembly, the steering shaft assembly including: an adapter plate; a steer housing spaced apart from and secured to the adapter plate, the steer housing comprising a boss extending toward the adapter plate; a bearing secured within the boss to prevent axial movement of the bearing; a steering shaft coupled to the bearing to allow rotation about a steering axis, the steering shaft comprising a first end and a main body; a shoulder extending away from an outer surface of the main body and positioned between the adapter plate and an upper surface of the boss; and at least one of a friction disc or spring disc positioned about the steering shaft between the shoulder and the bearing. The first end of the steering shaft extends through an opening in the adapter plate and is secured to the steering control device. Coupling the steering shaft assembly to the steering control device exerts a load on the at least one friction disc or spring disc, in which the at least one friction disc or spring disc provides a constant steering resistance upon rotation of the steering shaft about the steering axis.

The shoulder may be coupled to a collar such that the shoulder and the collar define a shouldered element, the shouldered element being separate from and moving axially along the main body of the steering shaft. An upper section of the collar may extend through the opening in the adapter plate and the steering control device may apply a force to the upper section of the collar.

The first end of the steering shaft may include a first threaded portion, and a second end of the steering shaft may include a second threaded portion, in which the coupling of the steering shaft assembly to the steering control device includes coupling respective first and second fasteners to the first and second threaded portions of the steering shaft.

The steering shaft assembly may further include a steering angle sensor associated with a second end of the steering shaft, the steering angle sensor being configured to detect angular displacement of the steering shaft about the steering axis.

In accordance with a third aspect of the present disclosure, a steering shaft assembly is provided, the steering shaft assembly including: an adapter plate; a steer housing spaced apart from and secured to the adapter plate, the steer housing comprising a boss extending toward the adapter plate; a steering shaft configured to rotate about a steering axis; a shoulder extending away from an outer surface of the main body and positioned between the adapter plate and the boss, an outer surface of the shoulder being aligned with or located inwardly with respect to an outer surface of the boss; and a spacer positioned about the outer surfaces of the boss and the shoulder. The steering shaft includes a main body, a first end and a second end, in which the first end extends through an opening in the adapter plate and in which the second end extends into the boss. Condensation entering the steering shaft assembly is directed from an inner surface of the spacer to an outer surface of the spacer via a plurality of openings.

The spacer may include an inner lip positioned between a lower surface of the shoulder and an upper surface of the boss. The inner lip and the plurality of openings may be angled downward in a direction extending away from the adapter plate. The plurality of openings may be positioned above the inner lip such that the condensation is prevented from entering a cavity defined between the shoulder and the boss.

The spacer may further include an outer lip and the steering shaft assembly may further include a biasing member positioned about the outer surface of the spacer between the adapter plate and the outer lip of the spacer, in which the biasing member biases the steering shaft toward a home position.

DETAILED DESCRIPTION

Figure 1:
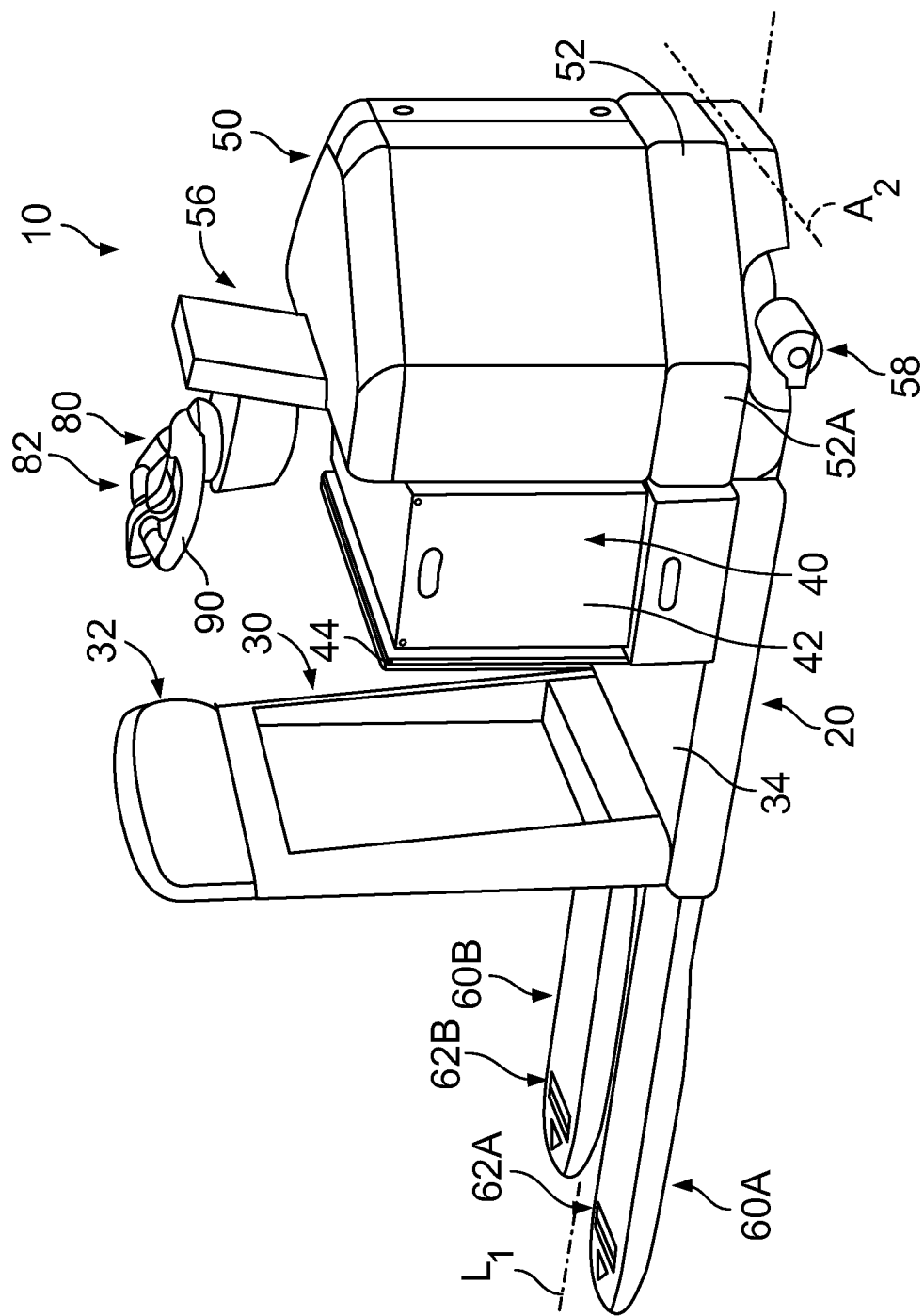
FIG. 1 is a perspective view of a materials handling vehicle in which a steering shaft assembly in accordance with the present disclosure may be incorporated.

A materials handling vehicle constructed in accordance with the present disclosure is shown in FIG. 1. While the materials handling vehicle illustrated in FIG. 1 is a pallet truck 10, it may be understood that the materials handling vehicle may include other types of industrial vehicles. The pallet truck 10 comprises a frame 20 including an operator's compartment 30, a battery compartment 40 for housing a battery 42, a base 52 forming part of a power unit 50, and a pair of load-carrying forks 60A and 60B. Each fork 60A, 60B comprises a corresponding load wheel assembly 62A, 62B. When the forks 60A, 60B are moved to a raised position, the load wheel assemblies 62A, 62B are pivoted relative to the forks 60A, 60B. The operator's compartment 30 and the battery compartment 40 move with the forks 60A, 60B relative to the power unit 50.

The operator's compartment 30 is defined by an operator's backrest 32, a side wall 44 of the battery compartment 40, and a floorboard 34. An operator stands on the floorboard 34 when positioned within the operator's compartment 30. A proximity sensor 36 (see FIG. 17) is positioned adjacent to the floorboard 34 for sensing the position of the floorboard 34. The proximity sensor 36 generates an operator status signal indicating that either an operator is standing on the floorboard 34 in the operator's compartment 30 or no operator is standing on the floorboard 34 in the operator's compartment 30. A change in the operator status signal indicates that an operator has either entered or exited the operator's compartment 30.

Figure 2:
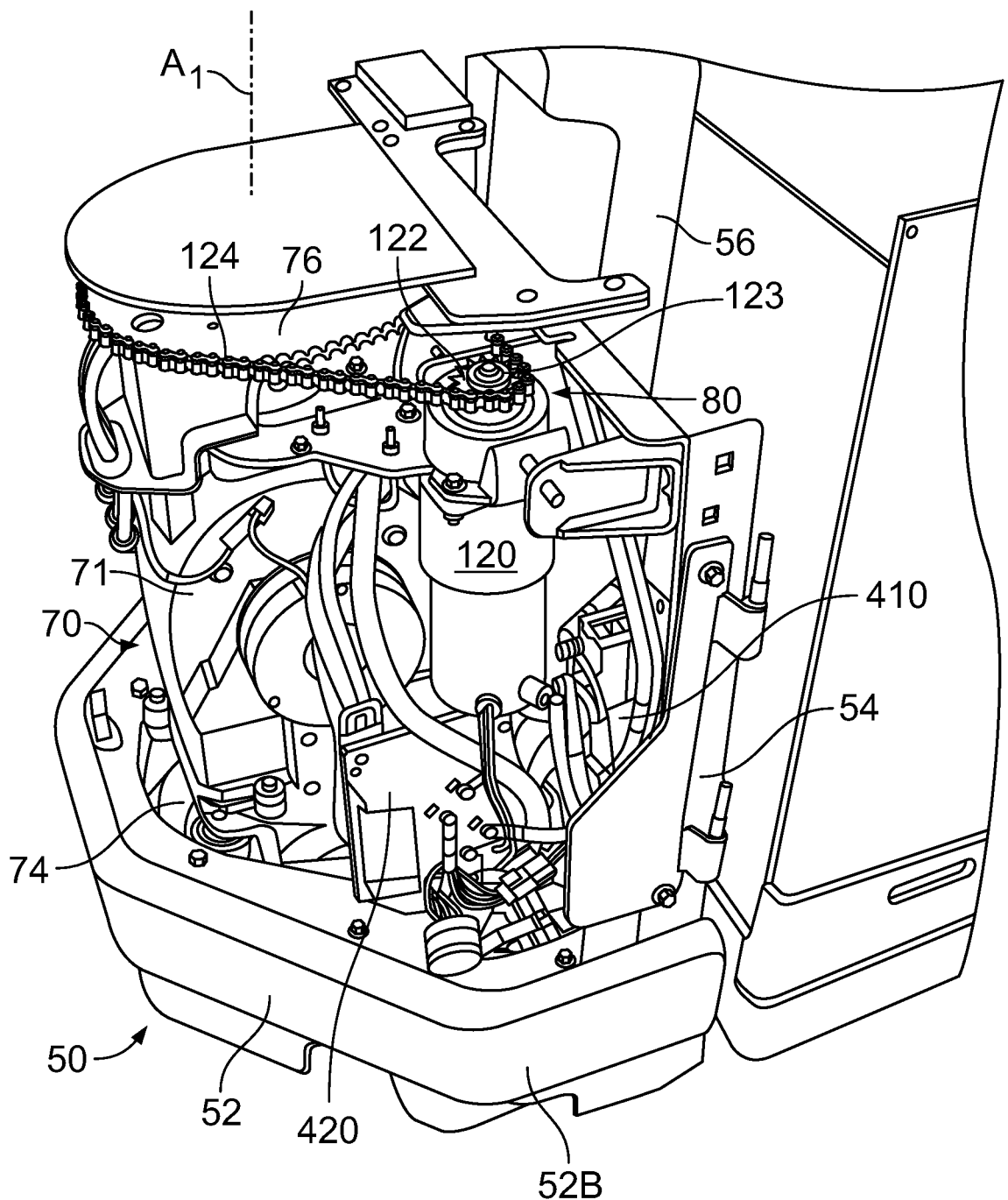
FIG. 2 is a perspective view of a power unit of the vehicle illustrated in FIG. 1 with covers removed from the power unit.

The power unit 50 comprises the base 52, a side wall 54 and a steering column 56, see FIGS. 1 and 2. The base 52, side wall 54, and steering column 56 are fixed together such that the steering column 56 does not rotate or move relative to the side wall 54 or the base 52 in the illustrated example. First and second caster wheels (only the first caster wheel 58 is illustrated; see FIG. 1) are coupled to the base 52 on opposing sides 52A and 52B of the base 52. The power unit 50 further comprises a drive unit 70 mounted to the base 52 so as to be rotatable relative to the base 52 about a first axis $A_1$. The drive unit 70 comprises a support structure 71 mounted to the base 52 so as to be rotatable relative to the base 52; a traction motor 72 (not labeled in FIG. 2; see FIG. 17) mounted to the support structure 71; and a driven steerable wheel 74 mounted to the support structure 71. The steerable wheel 74 is coupled to the traction motor 72 so as to be driven by the traction motor 72 about a second axis $A_2$. The steerable wheel 74 also moves together with the traction motor 72 and the support structure 71 about the first axis $A_1$.

Figure 17:
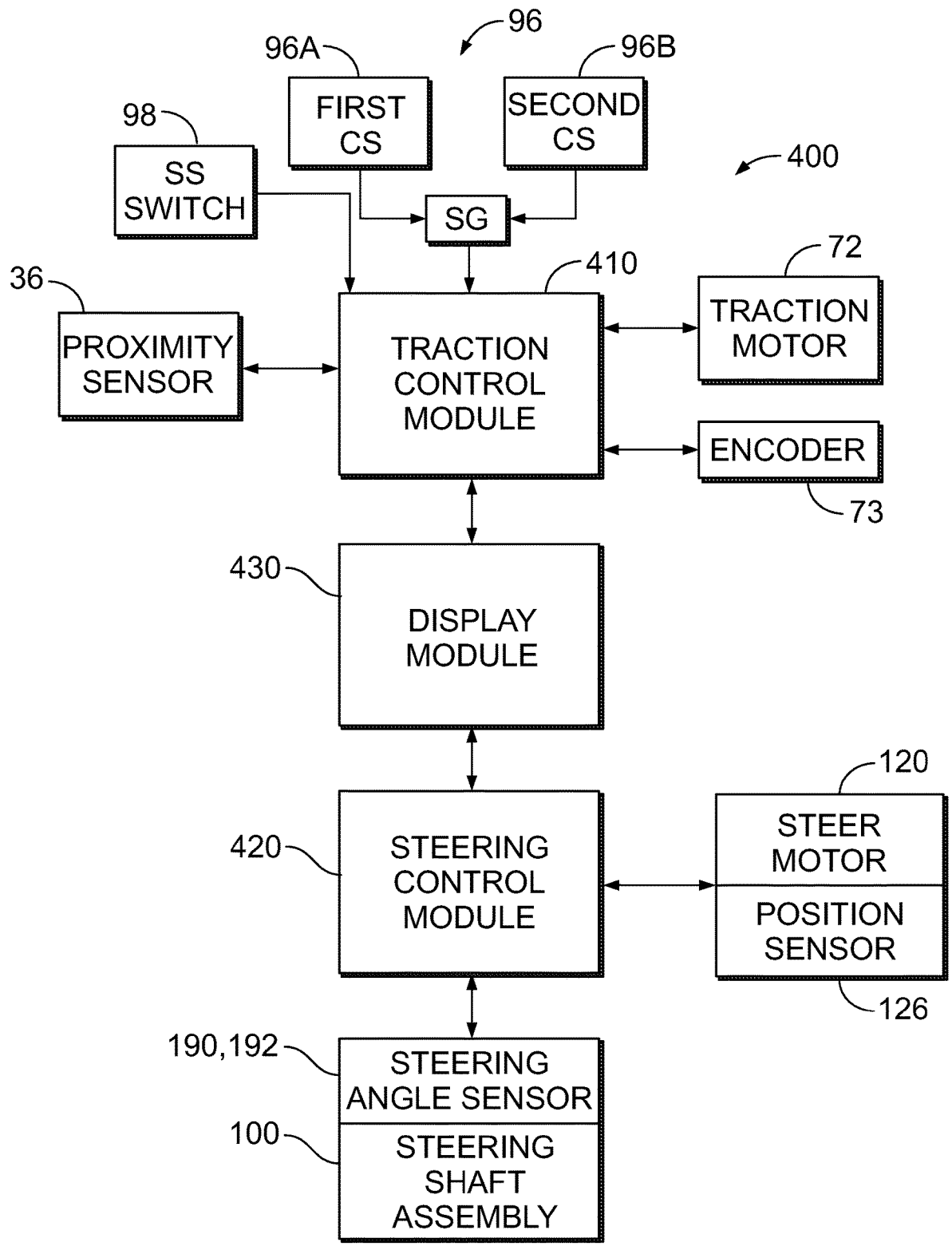
FIG. 17 is a schematic block diagram of a control apparatus from the vehicle illustrated in FIG. 1.

As shown in FIG. 17, an encoder 73 generates signals indicative of the speed and direction of rotation of the traction motor 72. In one example, the encoder 73 is coupled to an output shaft (not shown) of the traction motor 72. In another example, the encoder 73 is coupled to an adjacent structure such as a support structure 71 (see FIG. 2) and monitors rotation of gearing structure positioned between the output shaft of the traction motor 72 and the steerable wheel 74.

Figure 3:
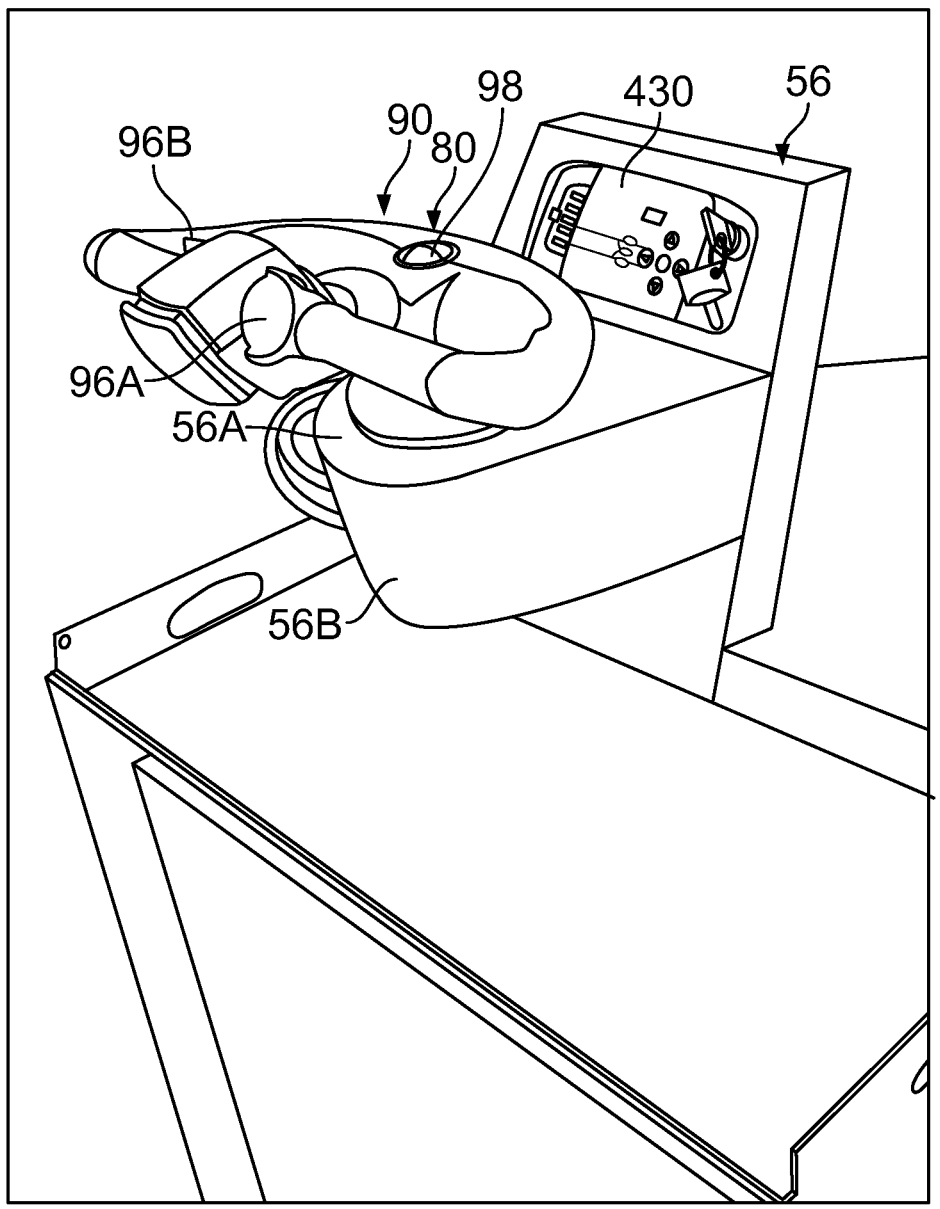
FIG. 3 is a perspective view of the control handle of the vehicle illustrated in FIG. 1.

With reference to FIGS. 1-3, the pallet truck 10 comprises a steer-by-wire system 80 for effecting angular movement of the steerable wheel 74 about the first axis $A_1$. The steer-by-wire system 80 comprises a steering control device 82, a steering shaft assembly 100, a steer motor 120, and the steerable wheel 74, as shown in FIGS. 1, 2, 4 and 17. The steering control device 82 may comprise a control handle 90. The steer-by-wire system 80 does not comprise a mechanical linkage structure directly connecting the control handle 90 to the steerable wheel 74 to effect steering of the steerable wheel 74. The term "steering control device" is intended to encompass the control handle 90 illustrated in FIG. 1 and like control handles, including steering tillers and steering wheels. The control handle 90 is capable of being rotated by an operator approximately +/−60 degrees from a centered or home position, wherein the home position corresponds to the steerable wheel 74 being located in a straight-ahead position. As shown in FIGS. 1-3, 4A, and 4B, the control handle 90 is coupled to the steering shaft assembly 100, which, in turn, is coupled to a steering column plate 56A of the steering column 56 via bolts 101 (only one bolt 101 is visible in FIG. 4B).

As shown in FIG. 2, the steer motor 120 comprises a drive gear 122 coupled to a steer motor output shaft 123. The drive unit 70 further comprises a rotatable gear 76 coupled to the support structure 71 such that movement of the rotatable gear 76 effects rotation of the support structure 71, the traction motor 72, and the steerable wheel 74 about the first axis $A_1$. A chain 124 extends about the drive gear 122 and the rotatable gear 76 such that rotation of the steer motor output shaft 123 and drive gear 122 causes rotation of the drive unit 70 and corresponding angular movement of the steerable wheel 74.

The pallet truck 10 further comprises a control system 400, which, in the illustrated embodiment, comprises a traction control module 410, a steering control module 420, and a display module 430, as shown in FIGS. 2, 3 and 17. Each of the modules 410, 420, and 430 comprises an electronic controller or an electronic processor for effecting functions to be discussed below. The functions effected by the modules 410, 420, and 430 may alternatively be performed by a single module, two modules or three or more modules. The traction control module 410 is mounted to the side wall 54, and the steering control module 420 is mounted to the base 52. In the example shown in FIGS. 1 and 3, the display module 430 is mounted within the steering column 56. In other examples (not shown), the display module 430) may comprise one or more additional or alternative display devices mounted to the steering column 56.

As shown in FIGS. 3 and 17, the control handle 90 further comprises first and second rotatable speed control elements 96A and 96B forming part of a speed control apparatus 96. One or both of the speed control elements 96A, 96B may be gripped and rotated by an operator to control a direction and speed of movement of the pallet truck 10. The first and second speed control elements 96A and 96B are mechanically coupled together such that rotation of one speed control element 96A, 96B effects rotation of the other speed control element 96B, 96A. The speed control elements 96A and 96B are spring biased to a center neutral or home position and coupled to a signal generator SG, which, in turn, is coupled to the traction control module 410. The signal generator SG is, for example, a potentiometer, which forms part of the speed control apparatus 96 and is capable of generating a speed control signal to the traction control module 410. The speed control signal varies in sign based on the direction of rotation of the speed control elements 96A, 96B, clockwise or counterclockwise from their home positions, and magnitude based on the amount of rotation of the speed control elements 96A, 96B from their home positions. When an operator rotates a speed control element 96A, 96B in a clockwise direction, as viewed in FIG. 3, a speed control signal is generated to the traction control module 410 corresponding to vehicle movement in a power unit first direction. When the operator rotates a speed control element 96A, 96B in a counter-clockwise direction, as viewed in FIG. 3, a speed control signal is generated to the traction control module 410 corresponding to vehicle movement in a forks first direction.

The control handle 90 further comprises a speed selection switch 98 that is capable of being toggled back and forth between a high speed position corresponding to a "high speed" mode and a low speed position corresponding to a "low speed" mode. Based on its position, the speed selection switch 98 generates a speed select signal to the traction control module 410. If the speed selection switch 98 is in its low speed position, the traction control module 410 may limit maximum speed of the pallet truck 10 to about 3.5 MPH in both a forks first direction and a power unit first direction. If the speed selection switch 98 is in its high speed position, the traction control module 410 will allow, unless otherwise limited based on other vehicle conditions, the vehicle to be operated up to a first maximum vehicle speed, e.g., 6.0 MPH, when the vehicle is being operated in a forks first direction and up to a second maximum vehicle speed, e.g., 9.0 MPH, when the vehicle is being operated in a power unit first direction. It is noted that when an operator is operating the pallet truck 10 without standing on the floorboard 34, referred to as a "walkie" mode, the traction control module 410 will limit maximum speed of the vehicle to the maximum speed corresponding to the low speed position, e.g., about 3.5 MPH, even if the speed selection switch 98 is located in its high speed position. It is noted that the speed of the pallet truck 10 within a speed range, e.g., 0)-3.5 MPH, 0-6.0 MPH, and 0)-9.0 MPH, corresponding to one of the low speed mode/walkie mode, the high speed mode/first maximum vehicle speed, and the high speed mode/second maximum speed is proportional to the amount of rotation of a speed control element 96A, 96B being rotated.

Figure 4A:
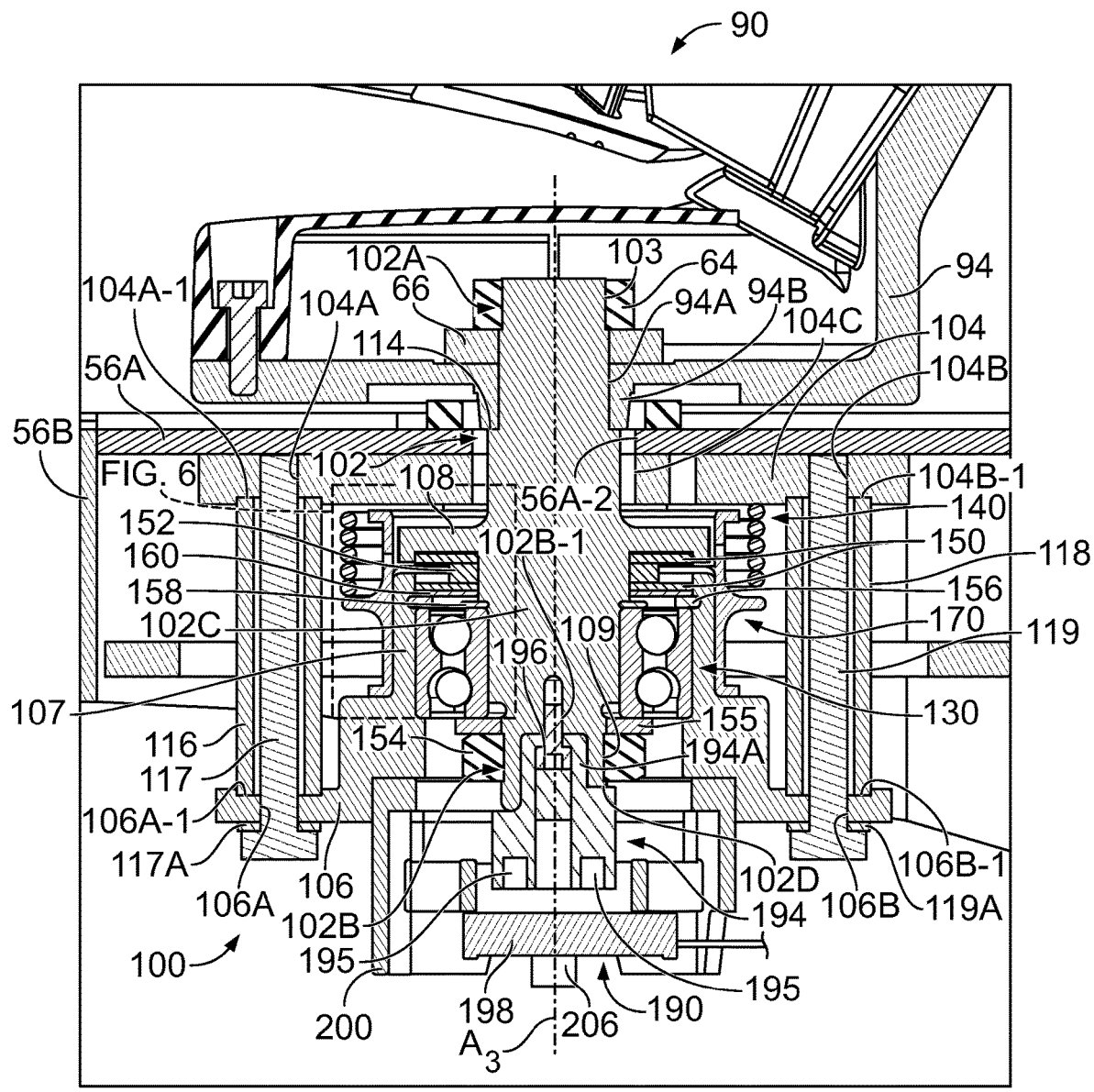
FIGS. 4A and 4B are views, partially in cross section, of a control handle and a steering shaft assembly, in accordance with the present disclosure.
Figure 4B:
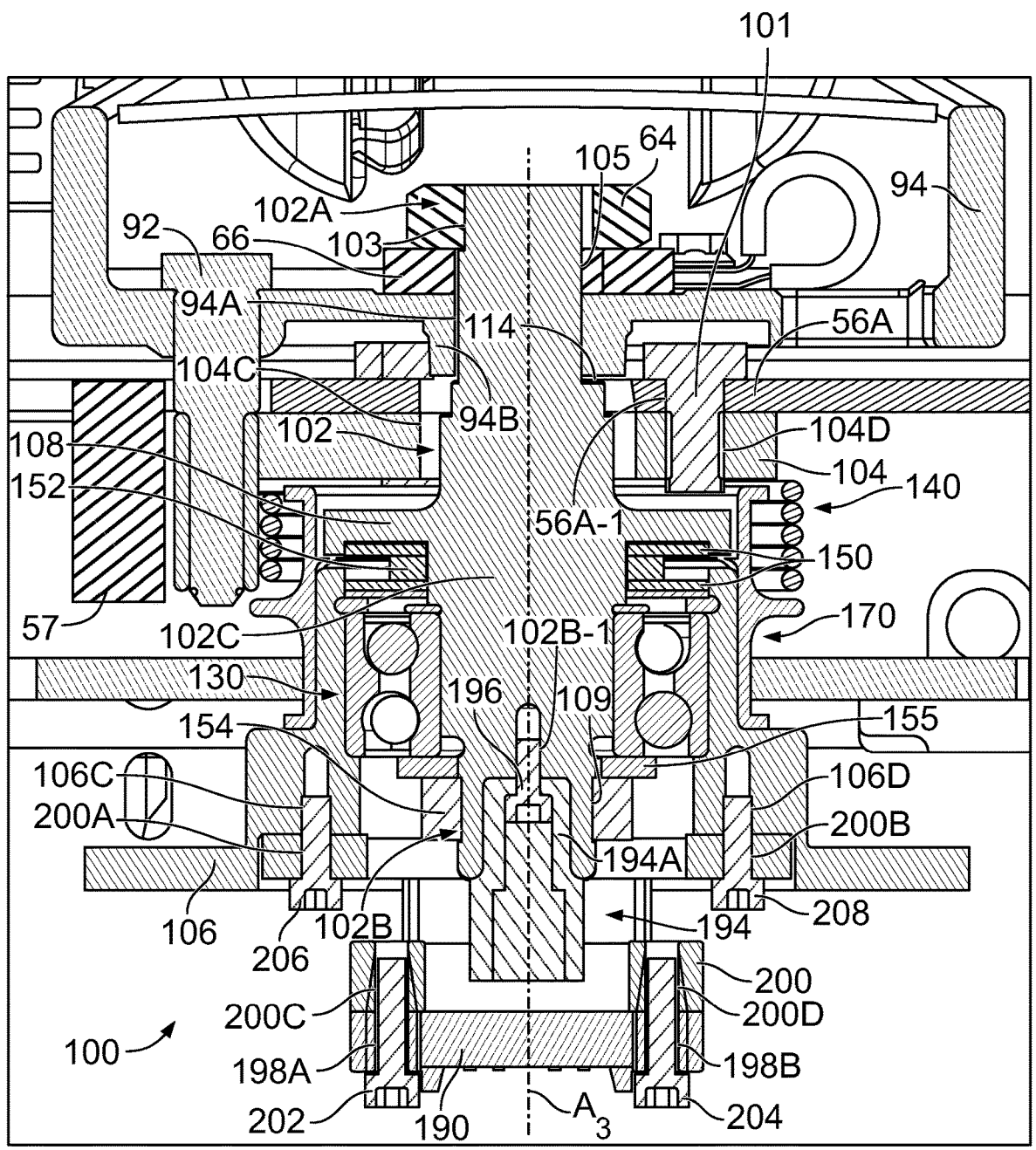
Figure 4C:
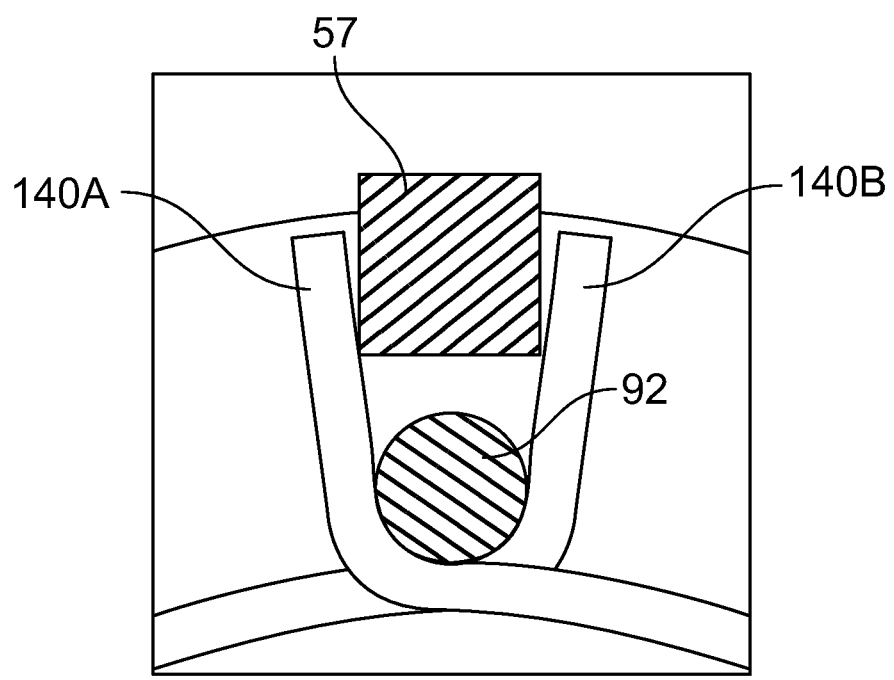
FIG. 4C is a view, partially in cross section, of a biasing structure of the control handle of FIGS. 4A and 4B.

FIGS. 4A and 4B illustrate the steering shaft assembly 100 in accordance with the present disclosure. FIG. 4A is a cross-sectional view taken through a center of the control handle 90 and the steering shaft assembly 100 along a longitudinal axis $L_1$ of the pallet truck 10 of FIG. 1. FIG. 4B is a cross-sectional view through the center of the steering shaft assembly 100 in a direction perpendicular to the longitudinal axis $L_1$ and looking toward the power unit 50.

As illustrated in FIGS. 4A and 4B, the steering shaft assembly 100 is coupled to the steering column plate 56A via bolts 101 (only one bolt 101 is visible in FIG. 4B). The bolts 101 extend through an opening 56A-1 formed in the steering column plate 56A and are received in threaded openings 104D (only one opening 104D is visible in FIG. 4B; see also FIG. 5) formed in an adapter plate 104 of the steering shaft assembly 100 so as to couple the adapter plate 104 and, hence, the steering shaft assembly 100, to the steering column plate 56A. A steering shaft 102 of the steering shaft assembly 100 is secured, e.g., fixedly coupled, to a base 94 of the control handle 90, such that the control handle 90 and the steering shaft 102 rotate together. One or more cover portions 56B of the steering column cover the steering shaft assembly 100.

Figure 5:
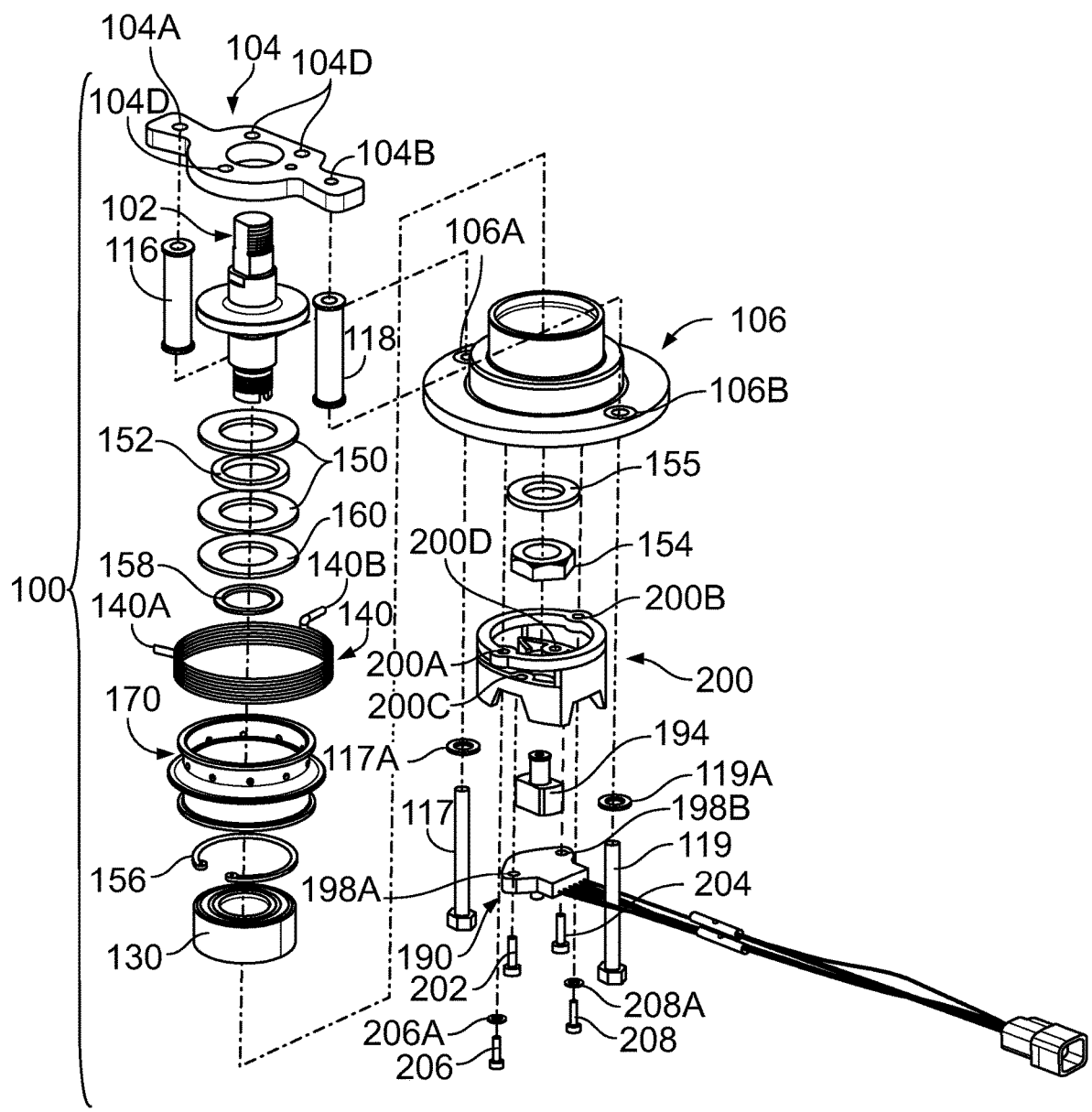
FIG. 5 is an exploded view of the steering shaft assembly illustrated in FIGS. 4A and 4B.

With reference to FIGS. 4A, 4B, and 5, the steering shaft assembly 100 further comprises a steer housing 106 spaced apart from and secured to the adapter plate 104, a bearing 130, a biasing member 140, and at least one of a friction disc 150 or a spring disc 152. The steer housing 106 is spaced apart from the adapter plate 104 by sleeves or standoffs 116, 118, which may be hollow. Fasteners 117, 119 may extend through openings 106A, 106B formed in the steer housing 106 and through the standoffs 116, 118, where the fasteners 117, 119 are received in threaded openings 104A, 104B formed in the adapter plate 104 to secure the adapter plate 104 to the steer housing 106. The threaded openings 104A, 104B may include counterbores 104A-1, 104B-1 that receive one end of the standoffs 116, 118. The openings 106A, 106B may likewise include counterbores 106A-1, 106B-1 that receive opposite ends of the standoffs 116, 118. Washers 117A, 119A may be positioned between the fasteners 117, 119 and the steer housing 106. A spacing between the adapter plate 104 and the steer housing 106 may be determined by a height (not labeled) of the standoffs 116, 118. The steer housing 106 comprises a boss 107 extending toward the adapter plate 104, and the bearing 130 is secured within the boss 107 to prevent axial movement of the bearing 130, e.g., along a third axis $A_3$ (also referred to herein as a steering axis), with respect to the steer housing 106, as described herein. The steering axis $A_3$ may be parallel to, but offset from, the first axis (not shown in FIGS. 4A and 4B; see FIG. 2). Also as described herein, the steering shaft 102 is coupled to the bearing 130 to allow rotation of the steering shaft 102 about the steering axis $A_3$.

Figure 7:
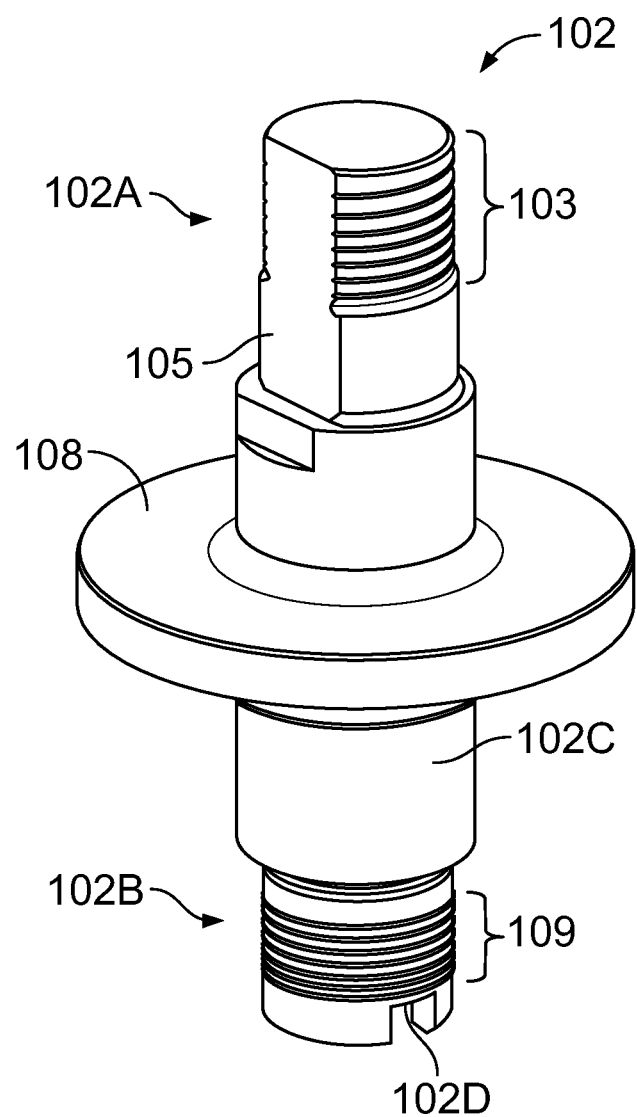
FIG. 7 is a perspective view of the steering shaft of the steering shaft assembly indicated in FIGS. 4A and 4B.

With reference to FIGS. 4A, 4B, and 7, the steering shaft 102 comprises a first end 102A, a second end 102B, a main body 102C, and a shoulder 108. The first end 102A of the steering shaft 102 may extend through an opening 104C formed in the adapter plate 104, an opening 56A-2 formed in the steering column plate 56A, and an opening 94A formed in a sleeve 94B of the base 94 and is adapted to be secured, e.g., fixedly coupled, to the control handle 90. For example, the first end 102A of the steering shaft 102 may comprise a threaded portion 103 and may be secured to the base 94 by engagement between the threaded portion 103 and a first fastener 64, such as a nut. A first retention shoulder 114 formed on the steering shaft 102 supports the sleeve 94B of the base 94 of the control handle 90. A washer 66 may be positioned between the first fastener 64 and the base 94. The first end 102A of the steering shaft 102 may comprise a flattened portion 105, and the opening 94A formed in the base 94 may comprise a complementary "D" shape (not shown) that engages the flattened portion 105, such that rotation of the control handle 90 about the steering axis $A_3$ causes rotation of the steering shaft 102 about the steering axis $A_3$. The second end 102B of the steering shaft 102 extends into the boss 107 of the steer housing 106 and may comprise a threaded portion 109 that is configured to receive a second fastener 154, such as a nut. A washer 155 may be positioned between the second fastener 154 and the bearing 130.

Figure 6A:
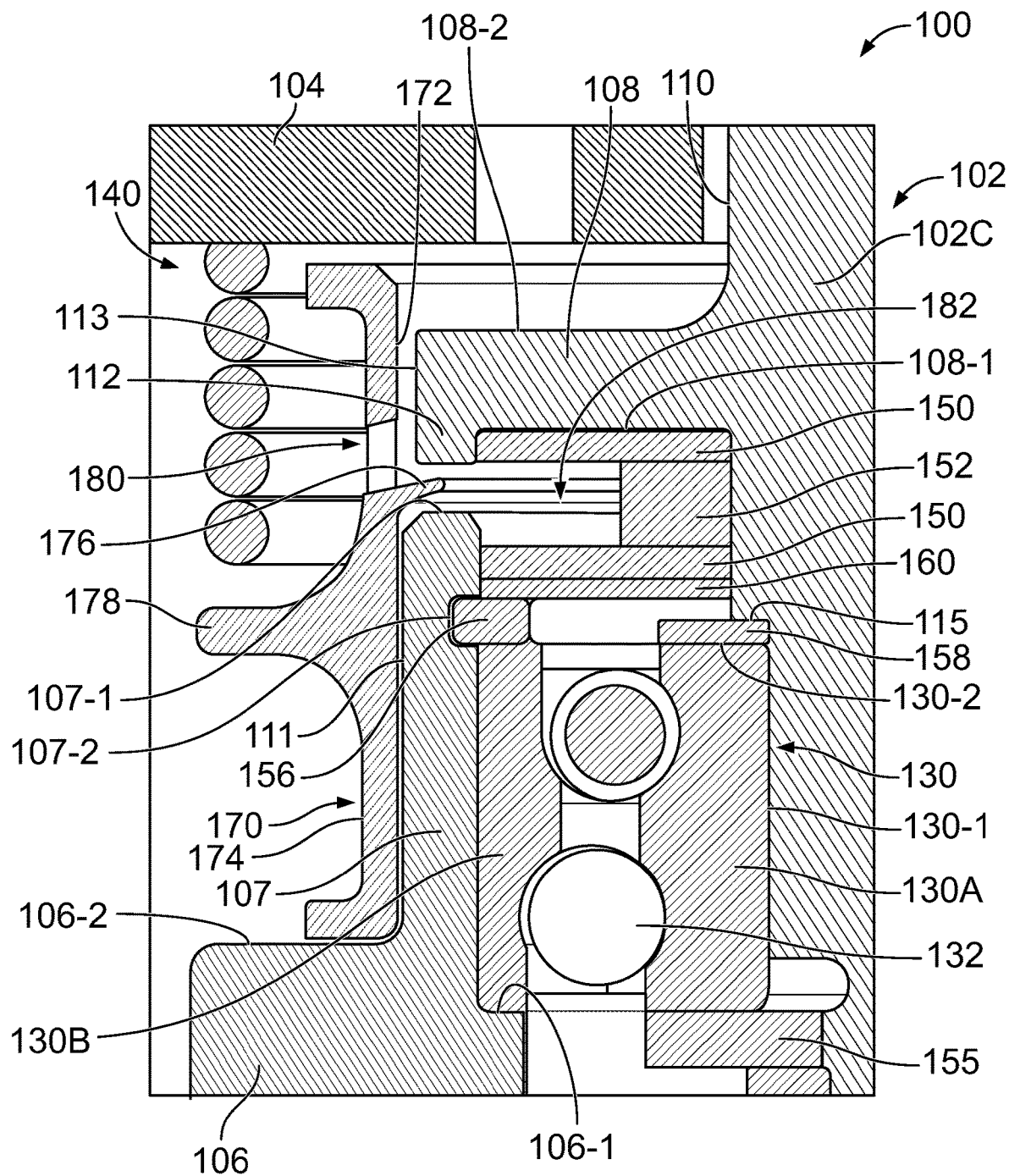
FIG. 6A is an enlarged view of a portion of the steering shaft assembly indicated in FIGS. 4A and 4B.

As shown in the detailed view of FIG. 6A, the steer housing 106 comprises a support shoulder 106-1 against which the bearing 130 rests when the bearing 130 is inserted into the boss 107. A snap ring 156 (see also FIGS. 4A and 5) is received in a recess 107-2 formed in the boss 107 and rests against an upper surface 130-2 of the bearing 130, such that the bearing 130 is secured within the boss 107 and axial movement of the bearing 130 relative to the boss 107 along the steering axis (not shown in FIG. 6A; see FIGS. 4A and 4B) is prevented. A thrust washer 158 (see also FIGS. 4A and 5) is received between the upper surface 130-2 of the bearing 130 and a second retention shoulder 115 formed on the main body 102C of the steering shaft 102, which supports an axial load of the steering shaft 102. The bearing 130 may comprise an inner race 130A and an outer race 130B, with ball bearings 132 positioned therebetween. The ball bearings 132 allow the inner race 130A to rotate relative to the outer race 130B. The outer race 130B may be secured within the boss 107, such that rotational movement of the outer race 130B is prevented. For example, the outer race 130B may be secured via a friction fit with an inner surface (not labeled) of the boss 107.

With reference to FIGS. 4A, 4B, and 6A, in a first example, the steering shaft 102 may be coupled to the bearing 130 by a friction fit between an outer surface 110 of an adjacent portion of the main body 102C of the steering shaft 102 and an inner surface 130-1 of the bearing 130, specifically the inner surface 130-1 of the inner race 130A. As described herein, the steering shaft 102 may be press fit into the bearing 130 until the second retention shoulder 115 is seated against the thrust washer 158, after which the steering shaft 102 and the inner race 130A of the bearing 130 rotate together about the steering axis $A_3$. Coupling of the second fastener 154 and the washer 155 to the second end 102B of the steering shaft 102 helps to seat the steering shaft 102 against the thrust washer 158 and prevents axial movement of the steering shaft 102 relative to the bearing 130. The washer 155 also helps to support the bearing 130 and distribute a load applied upon installation of the steering shaft assembly 100.

In a second example, there may be a slip fit between the steering shaft 102 and the bearing 130, such that prior to assembly of the steering shaft assembly 100, the steering shaft 102 moves freely along the steering axis $A_3$ with respect to the bearing 130. As described herein, the steering shaft 102 is coupled to the bearing 130 in this example by a clamp load applied between the second fastener 154 and the second retention shoulder 115 formed on the steering shaft 102, specifically the thrust washer 158 engaged with the second retention shoulder 115, when the second end 102B of steering shaft 102 extends through the bearing 130 and the threaded portion 109 is coupled to the second fastener 154. Similar to the first example, the washer 155 helps to support the bearing 130, and coupling of the second fastener 154 and the washer 155 to the second end 102B of the steering shaft 102 helps to prevent axial movement of the steering shaft 102 relative to the bearing 130.

As shown in FIG. 6A, the shoulder 108 extends outwardly and away from, and is fixedly coupled to, the outer surface 110 of the main body 102C of the steering shaft 102. In some examples, the shoulder 108 is integral with the steering shaft 102. e.g., the steering shaft 102 is manufactured as a one-piece element comprising the shoulder 108. In other examples, the main body 102C of the steering shaft 102 and the shoulder 108 may be manufactured separately, and the shoulder 108 may be affixed to the main body 102C of the steering shaft 102. The shoulder 108 may be permanently or statically attached to the main body 102C of the steering shaft 102 via welding (e.g., laser welding), press fitting, application of adhesive, mechanical coupling (e.g., insertion of a roll pin or a set screw), or other suitable attachment method. Manufacture of the main body 102C and shoulder 108 as separate components may allow for greater flexibility and tighter tolerances, as compared to a one-piece component.

In the example shown in FIG. 6A, the shoulder 108 extends outwardly at about a 90 degree angle (±5 degrees) with respect to the outer surface 110 of the main body 102C of the steering shaft 102. i.e., substantially perpendicular to the outer surface 110. In other examples (not shown), the shoulder 108 may extend outwardly at about a 45 degree angle or any other angle between 45-90 degrees with respect to the outer surface 110, either toward the adapter plate 104 or toward the steer housing 106. The boss 107 extends substantially perpendicular to the adapter plate 104, and the shoulder 108 is positioned between the adapter plate 104 and an upper surface 107-1 of the boss 107. An outer surface 113 of the shoulder 108 may be aligned with, or located inwardly with respect to, an outer surface 111 of the boss 107. As shown in FIG. 6A, the shoulder 108 comprises an optional lip 112 formed on a lower surface 108-1 of the shoulder 108 and extending toward the upper surface 107-1 of the boss 107.

Figure 6B:
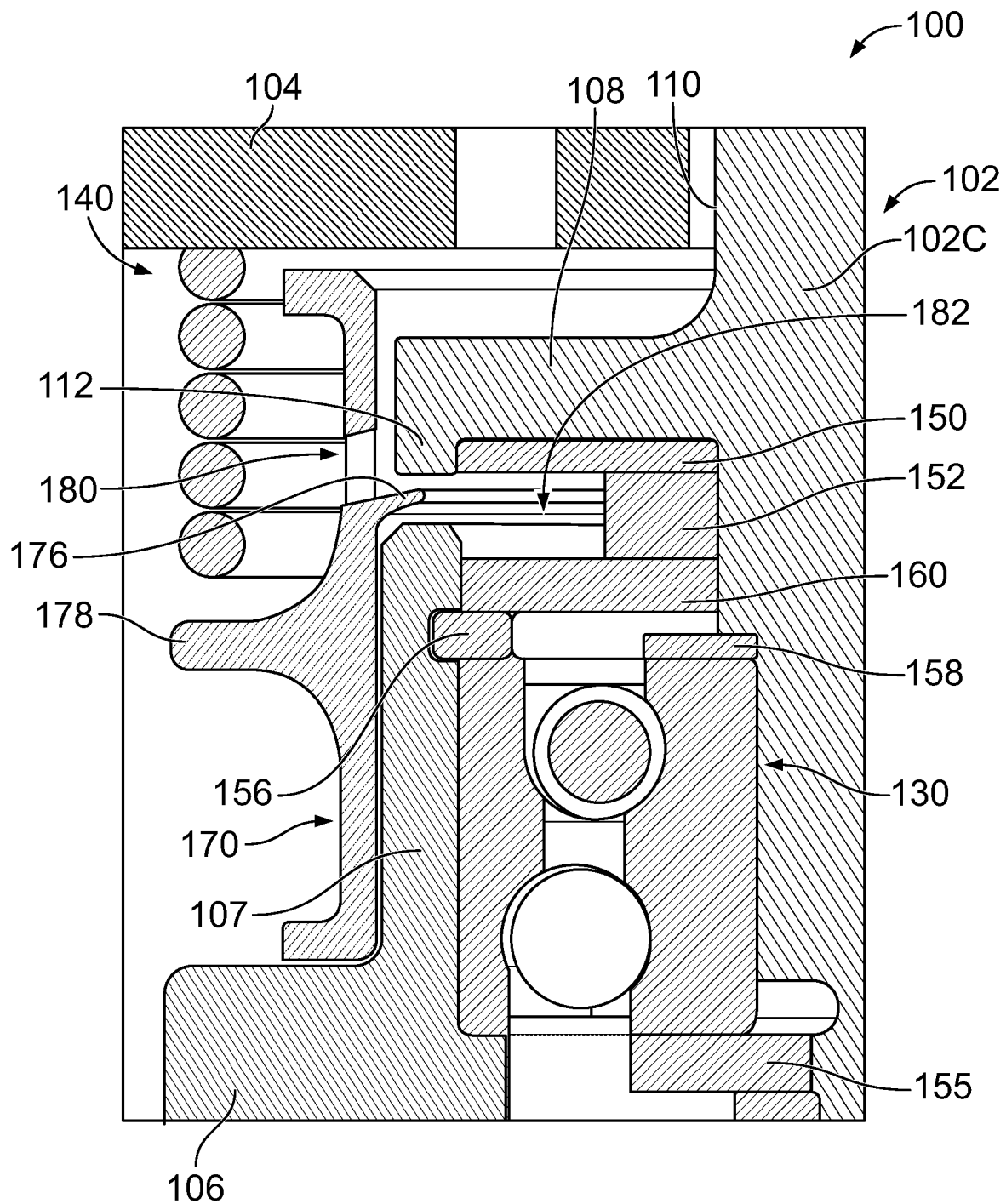
FIG. 6B is an enlarged view similar to FIG. 6A of another exemplary steering shaft assembly in accordance with the present disclosure.

With reference to FIGS. 4A, 4B, 5, and 6A, the one or more friction discs 150 and/or one or more spring discs 152 are positioned about the steering shaft 102 between the shoulder 108 and the bearing 130. A second thrust washer 160 is positioned between the snap ring 156 and the adjacent friction disc 150 or spring disc 152. The friction disc(s) 150 and/or the spring disc(s) 152 are not fixed to any component of the steering shaft assembly 100 and are free to rotate about the steering shaft 102. The lip 112 of the shoulder 108 may help to maintain the correct positioning of the friction disc(s) 150 and/or the spring disc(s) 152 about the steering shaft 102. The spring disc 152 is compressible, as described herein. In the example shown, the steering shaft assembly 100 includes first and second friction discs 150) and one spring disc 152 positioned between the first and second friction discs 150, in which the first or upper friction disc 150 is seated against the lower surface 108-1 of the shoulder 108 and the second or lower friction disc 150 is contained within the boss 107 and seated against the second thrust washer 160. In other examples, the steering shaft assembly 100 may include different configurations, such as one friction disc 150 and one spring disc 152 as shown in FIG. 6B; a single spring disc 152; two friction discs 150 adjacent to each other; etc. In all examples, the steering resistance may be changed by altering one or more parameters of the friction disc(s) 150, e.g., a type of material, a thickness, etc., changing the number and/or configuration of the friction disc(s) 150 and/or the spring disc(s) 152, and/or by adding one or more spacer discs (not shown).

Figure 8:
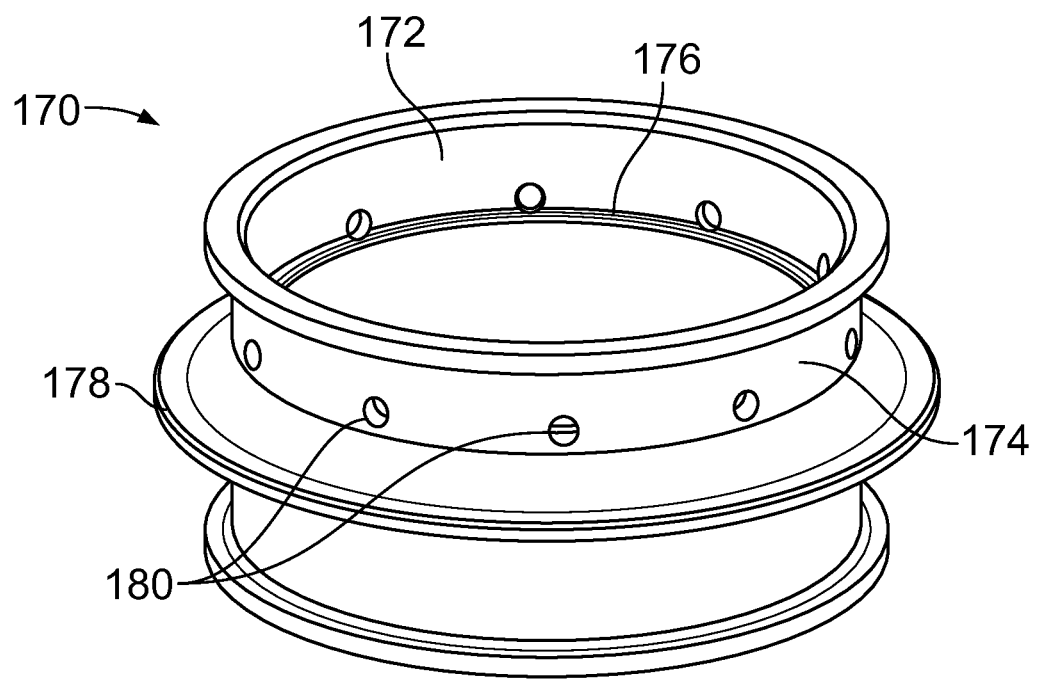
FIG. 8 is a perspective view of a spacer, in accordance with the present disclosure.
Figure 9:
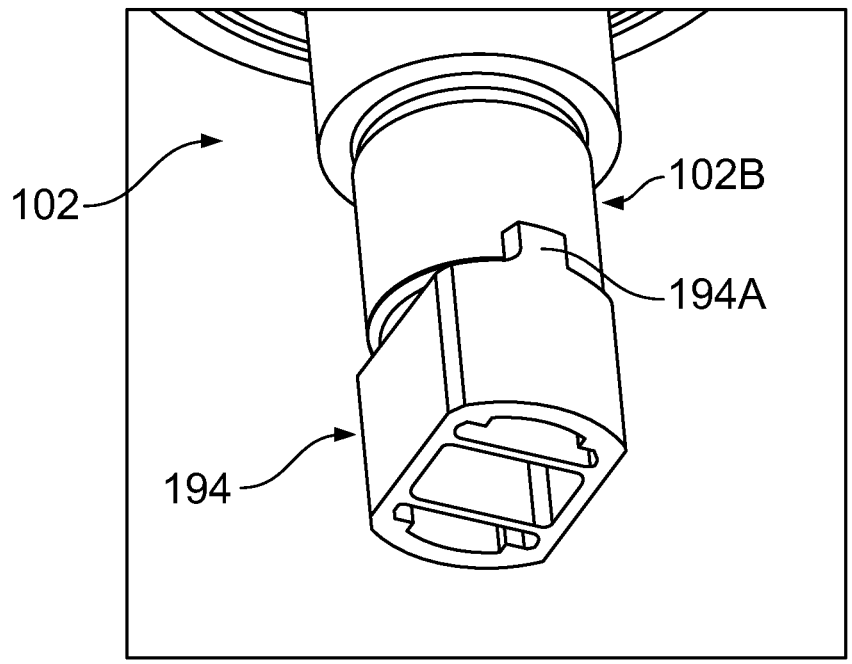
FIG. 9 is a perspective view of a second end of a steering shaft with a steering angle sensor, in accordance with the present disclosure.

With reference to FIGS. 4A, 4B, 5, 6A, and 8, the steering shaft assembly 100 may further comprise a spacer 170 positioned about and fitted over the outer surface 111 of the boss 107, e.g., via a slip fit, and the outer surface 113 of the shoulder 108 when the steering shaft assembly 100 is assembled. The spacer 170 may be substantially cylindrical and may comprise an inner surface 172, an outer surface 174, an inner lip 176, an outer lip 178, and a plurality of openings 180, as shown in FIGS. 6A and 8. A lower portion (not labeled) of the spacer 170 may rest against a step 106-2 of the steer housing 106. In some examples, when the steering shaft assembly 100 is assembled, an upper portion (not labeled) of the spacer 170 may be spaced apart from the adapter plate 104, as shown in FIGS. 4A, 4B, and 6A. In other examples, the upper portion of the spacer 170 may contact the adapter plate 104.

As shown in FIG. 6A, the inner lip 176 of the spacer 170 is positioned between the upper surface 107-1 of the boss 107 and the lower surface 108-1 of the shoulder 108, specifically a lower surface (not labeled) of the lip 112. When the steering shaft assembly 100 is assembled, the inner lip 176 of the spacer 170 remains spaced apart from the lip 112 of the shoulder 108 to avoid interfering with rotation of the steering shaft 102. The spacer 170 may be configured such that condensation, i.e., water and/or other liquid(s), entering the steering shaft assembly 100 is prevented from entering a cavity 182 defined between the shoulder 108 of the steering shaft 102 and the boss 107 of the steer housing 106. Condensation may be directed from the inner surface 172 of the spacer 170 to the outer surface 174 of the spacer 170 via the plurality of openings 180. In particular, condensation may travel down the outer surface 110 of the steering shaft 102, along an upper surface 108-2 of the shoulder 108, and down the outer surface 113 of the shoulder 108, where the condensation is directed onto the inner lip 176 of the spacer 170 and out through the openings 180. The inner lip 176 and openings 180 may be angled downward in a direction extending away from the adapter plate 104 to facilitate removal of the condensation.

With reference to FIGS. 4A-4C, 5, and 6A, the biasing member 140 may comprise, for example, a coiled spring, e.g., a torsion spring, that comprises first and second ends 140A, 140B. The biasing member 140 is positioned about the boss 107 of the steer housing 106. Specifically, as best seen in FIG. 6A, the biasing member 140 may be positioned about the outer surface 174 of the spacer 170 between the adapter plate 104 and the outer lip 178 of the spacer 170. The outer lip 178 of the spacer 178 may extend outwardly at about a 90 degree angle with respect to the outer surface 174 of the spacer 170, and the biasing member 140 may rest on the outer lip 178 of the spacer 170, such that the outer lip 178 may provide a desired positioning and spacing of the biasing member 140 axially with respect to the other elements of the steering shaft assembly 100, i.e., along the steering axis $A_3$ (not shown in FIG. 6A; see FIGS. 4A and 4B). A pin 92 (shown in FIGS. 4B and 4C) is fixed to and extends down from the base 94 of the control handle 90 and moves with the control handle 90. The pin 92 extends into and moves along a slot (not labeled) provided in the steering column plate 56A. A block 57 (shown in FIGS. 4B and 4C) is fixed to and extends down from the steering column plate 56A. When the steering shaft assembly 100 is installed and the control handle 90 is located in a centered or home position, the pin 92 is positioned between and adjacent to the ends 140A, 140B of the biasing member 140, and the ends 140A, 140B engage and rest against the block 57, as shown FIG. 4C. The spacer 170 provides a support for the biasing member 140 and helps to position the biasing member 140, specifically the ends 140A, 140B, relative to the block 57 and the pin 92. As the control handle 90 is rotated by an operator away from the home position, the pin 92 engages and pushes against one of the ends 140A, 140B, causing that one end 140A, 140B to move with the pin 92 away from the block 57 while the other end 140B, 140A is held stationary by the block 57. In response, the one end 140A, 140B applies a return force against the pin 92 and, hence, to the control handle 90, in a direction urging the control handle 90 to return to the home position. When the operator is no longer gripping and turning the control handle 90, the biasing member 140 causes the control handle 90 to return to the home position. In this manner, the biasing member 140) also helps to contribute to a net steering resistance.

The following provides an exemplary method of assembling the steering shaft assembly 100 shown in FIGS. 4A, 4B, 5, and 6A. Assembly may begin with press-fitting the bearing 130 into the boss 107 of the steer housing 106 until the bearing 130 is fully seated, i.e., resting against the support shoulder 106-1. The bearing 130 is then held in the boss 107 via a friction fit, and the snap ring 156 is installed into the recess 107-2 to further prevent axial movement of the bearing 130. The spacer 170 is installed over the boss 107 until the lower portion of the spacer 170 contacts the step 106-2 of the steer housing 106. The thrust washer 158 is placed onto the upper surface 130-2 of the bearing 130, specifically the upper surface 130-2 of the inner race 130A. The second thrust washer 160 is placed onto the snap ring 156, and one of the friction discs 150 is placed onto/over the second thrust washer 160. The other friction disc 150 is installed over the second end 102B of the steering shaft 102 and seated against the lower surface 108-1 of the shoulder 108. The spring disc 152 is then installed over the second end 102B of the steering shaft 102 and seated against the other friction disc 150, after which the steering shaft 102, friction disc 150, and spring disc 152 are installed into the steer housing 106. In the first example, the second end 102B of the steering shaft 102 is press fit into the bearing 130) until the second retention shoulder 115 is seated against the thrust washer 158, such that the steering shaft 102 is coupled to the bearing 130 by a friction fit between the outer surface 110 of an adjacent portion of the main body 102C of the steering shaft 102 and the inner surface 130-1 of the bearing 130. In the second example, there is a slip fit between the steering shaft 102 and the bearing 130, such that that the steering shaft 102 moves freely with respect to the bearing 130 until the second fastener 154 and washer 155 are installed on the second end 102B of the steering shaft 102, as described below. In both examples, the friction discs 150 and spring disc 152 are sandwiched/clamped between the shoulder 108 and the second thrust washer 160 upon installation of the steering shaft 102 into the bearing 130.

Assembly of the steering shaft assembly 100 continues by positioning the biasing member 140 about the spacer 170 and positioning the steer housing 106 so that the first end 102A of the steering shaft 102 extends through the central opening 104C of the adapter plate 104. The standoffs 116, 118 are positioned so that one end of each standoff 116, 118 is seated in a respective one of the counterbores 104A-1, 104B-1 formed in the adapter plate 104 and the opposite end is seated in a respective one of the counterbores 106A-1, 106B-1 formed in the steer housing 106. The fasteners 117, 119 are installed through the openings 106A, 106B in the steer housing 106 into the standoffs 116, 118 and are received in the threaded openings 104A, 104B formed in the adapter plate 104 to secure the steer housing 106 to the adapter plate 104. The second fastener 154 and the washer 155 are then installed on the second end 102B of the steering shaft 102 by coupling the second fastener 154 to the threaded portion 109 of the steering shaft 102. The steering shaft assembly 100 is coupled to the steering column plate 56A by passing the bolts 101 through the openings 56A-1 formed in the steering column plate 56A and securing the bolts 101 into the threaded openings 104D in the adapter plate 104. Thereafter, the opening 94A formed in the base 94 is placed onto the first end 102A of the steering shaft 102, i.e., the base 94 is placed onto the first end 102A of the steering shaft 102, such that the flattened portion 105 of the steering shaft 102 engages with the complementary portion of the opening 94A and the steering shaft 102 rotates with the control handle 90. Concurrent with the opening 94A being placed over the first end 102A of the steering shaft 102, the pin 92 extends into the slot provided in the steering column plate 56A. Once the opening 94A is placed over the first end 102A of the steering shaft 102, the washer 66 is fitted over the first end 102A of the steering shaft 102, and the first fastener 64 is secured to the threaded portion 103 formed in the first end 102A of the steering shaft 102 to couple the steering shaft assembly 100 and the steering column plate 56A (which are already coupled together, as described above) to the base 94.

In the first example, a load is applied to the friction discs 150 and the spring disc 152 when the steering shaft 102 is press fit into the bearing 130. Coupling of the second fastener 154 and the washer 155 to the second end 102B of the steering shaft 102 may apply a relatively small, additional load to the friction discs 150 and the spring disc 152. In the second example, a load is applied to the friction discs 150 and the spring disc 152 upon coupling of the second fastener 154 and the washer 155 to the second end 102B of the steering shaft 102. In both examples, installation of the second fastener 154 and the washer 155 provides a clamp load between the second retention shoulder 115 and the second fastener 154, which prevents axial movement of the steering shaft 102 and the bearing 130 with respect to one another.

The load exerted on the friction disc(s) 150 and/or spring disc(s) 152 by the shoulder 108 and the bearing 130 during assembly of the steering shaft assembly 100 (e.g., by press fitting the steering shaft 102 into the bearing 130 in the first example or coupling of the second fastener 154 to the second end 102B of the steering shaft 102 in the second example) compresses the spring disc(s) 152 (also known as a wave washer or spring washer), such that the friction disc(s) 150 and/or spring disc(s) 152 provide a constant steering resistance upon rotation of the steering shaft 102 about the steering axis $A_3$. In particular, when the steering shaft assembly 100 is assembled as described above, the friction disc(s) 150 and/or spring disc(s) 152 are compressed between the shoulder 108 and the bearing 130, more specifically between the shoulder 108 and the second thrust washer 160, with the steering resistance being set by a distance between the lower surface 108-1 of the shoulder 108 and the second thrust washer 160. It is also noted that when the steering shaft 102 is press fit into the bearing 130 and/or the second fastener 154 is tightened on the second end 102B of the steering shaft 102, the steering shaft 102 may move relative to the bearing 130, which may cause a slight deformation of the thrust washer 158 as the second retention shoulder 115 moves toward the bearing 130.

In the example shown in FIGS. 4A, 4B, 5, and 6A, the spring disc 152 may push the friction discs 150 apart and toward an adjacent structure, i.e., the lower surface 108-1 of the shoulder 108 and the second thrust washer 160, respectively, which creates a frictional resistance between engaging contact surfaces of the shoulder 108 and the first or upper friction disc 150, between engaging contact surfaces of the friction disc(s) 150 and the spring disc 152, and between engaging contact surfaces of the second or lower friction disc 150 and the second thrust washer 160. In the example shown in FIG. 6B, the spring disc 152 may similarly push the friction disc 150 toward the lower surface 108-1 of the shoulder 108 to create a frictional resistance, and the spring disc 152 may also create frictional resistance by acting against the adjacent thrust washer 160. In both examples, the second thrust washer 160) may create some frictional resistance, as the second thrust washer 160 may contact and move relative to the snap ring 156. Once the steering shaft assembly 100 is assembled as described above, axial movement of the components is prevented, such that a steering resistance of greater than zero is always provided. The amount of steering resistance may be altered by disassembling the steering shaft assembly 100 and changing one or more parameters of the friction disc(s) 150 and/or the spring disc(s) 152, as described herein.

The steering shaft assembly 100 shown in FIGS. 4A, 4B, 5, and 6A provides a simpler steering system that provides a constant steering resistance via the friction disc(s) 150 and/or spring disc(s) 152 and does not require the use of, for example, a magnetic field generating device, an electrically controlled brake, and a magnetically controllable medium to provide the steering resistance. The spacer 170 ensures that condensation entering the steering shaft assembly 100 is redirected and does not enter the cavity 182 containing the friction and/or spring disc(s) 150, 152, the bearing 130, etc. When the steering shaft assembly 100 is used in a freezer or other location with cold temperatures, any liquid present in the cavity 182 may freeze and cause the steering to lock up.

In addition, repeated entry of liquid into the cavity 182 may cause corrosion and other damage over time and may result in premature failure of one or more components. The spacer 170 also helps to properly position the biasing member 140 axially, i.e., along the steering axis $A_3$.

Figure 11:
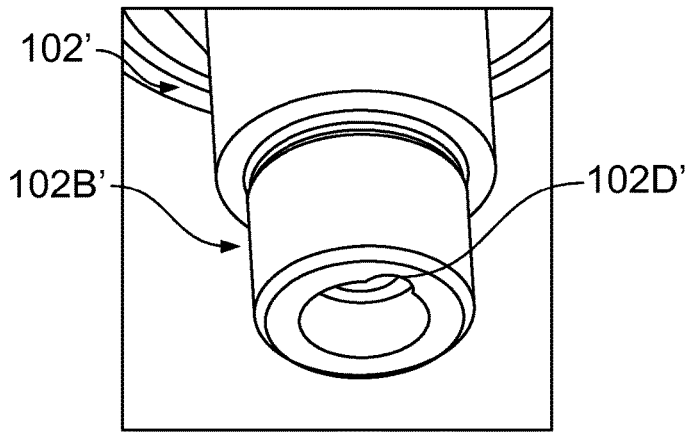
FIG. 11 is a perspective view of a second end of a steering shaft, in accordance with the present disclosure.
Figure 12:
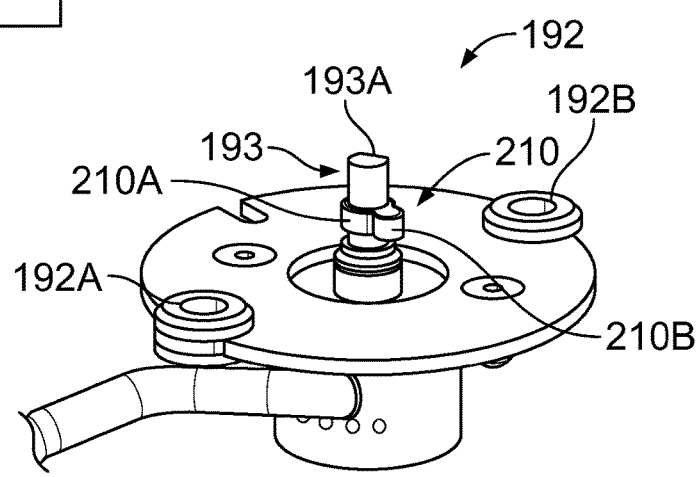
FIG. 12 is a perspective view of a steering angle sensor comprising a potentiometer, in accordance with the present disclosure.

As shown in FIGS. 4A, 4B, 5, and 9, a steering angle sensor 190, which may comprise a Hall-effect sensor, is associated with the second end 102B of the steering shaft 102. As shown in FIGS. 11 and 12, a steering angle sensor 192, which may comprise a potentiometer, is associated with a second end 102B' of another exemplary steering shaft 102'. In both examples, the steering angle sensor 190, 192 is configured to detect angular displacement of the steering shaft 102, 102' about the steering axis $A_3$. An operator rotates the control handle 90 to control movement of the steerable wheel 74, with the angular position of the steering shaft 102, 102' corresponding to the angular position of the control handle 90. The steerable wheel 74 is capable of rotating approximately +/−90 degrees from a centered position, and the control handle 90 may have an angular range of approximately +/−60 degrees, i.e., a steering ratio of about 1.5:1. As the control handle 90 is rotated by the operator, the steering angle sensor 190, 192 senses that rotation, i.e., magnitude and direction, and generates a steer control signal corresponding to a desired angular position of the steerable wheel 74 to the steering control module 420.

In the example shown in FIGS. 4A, 4B, 5, and 9, the steering angle sensor 190 is a Hall-effect sensor comprising a casing 198, and the second end 102B of the steering shaft 102 is configured to receive a sensor assembly 194 comprising a magnetic material 195. The second end 102B of the steering shaft 102 may comprise a notch 102D (see also FIG. 7) that is configured to receive a tab 194A formed on the sensor assembly 194, and the sensor assembly 194 may be coupled to the second end 102B of the steering shaft 102 via a fastener 196 that is received in a threaded bore 102B-1 formed in the second end 102B of the steering shaft 102. In this manner, the sensor assembly 194 is fixed with respect to the steering shaft 102, and the magnetic material 195 within the sensor assembly 194 is disposed at a predefined location with respect to the steering shaft 102. When the operator rotates the control handle 90 about the steering axis $A_3$, the steering shaft 102 and the sensor assembly 194 also rotate, and sensor elements (not shown) of the Hall-effect sensor determine a steering angle based on sensing of a magnetic field generated by the magnetic material 195 in the sensor assembly 194.

The steering shaft assembly 100 may further comprise a sensor housing 200 secured, e.g., fixedly coupled, to the steer housing 106 and configured to receive the steering angle sensor 190, as shown in FIGS. 4A, 4B, 5, and 10. Fasteners 206, 208 extend through apertures 200A, 200B formed in the sensor housing 200 and are received in threaded openings 106C, 106D formed in the steer housing 106. Washers 206A, 208A may be positioned between the fasteners 206, 208 and the sensor housing 200. The casing 198 of the steering angle sensor 190 comprises apertures 198A, 198B through which fasteners 202, 204 extend and are received in threaded openings 200C, 200D formed in the sensor housing 200 to secure the casing 198 to the sensor housing 200. The sensor housing 200 may comprise legs 200-1, 200-2, 200-3 that extend outward to partially enclose and protect the steering angle sensor 190. The sensor housing 200 may be used to maintain an air gap between the magnetic material 195 of the sensor assembly 194 and the sensor elements of the Hall-effect sensor.

To install the steering angle sensor 190 and the sensor housing 200, the sensor assembly 194 is coupled to the second end 102B of the steering shaft 102 by inserting the tab 194A into the notch 102D formed in the second end 102B of the steering shaft 102 and installing the fastener 196 into the threaded bore 102B-1. The sensor housing 200 is coupled to the steer housing 106 by installing the fasteners 206, 208 into the threaded openings 106C, 106D formed in the steer housing 106. The steering angle sensor 190 is then coupled to the sensor housing 200 by installing the fasteners 202, 204 into the threaded openings 200C, 200D formed in the sensor housing 200.

In the example shown in FIGS. 11 and 12, the steering angle sensor 192 is a potentiometer, and the second end 102B' of the steering shaft 102' is configured to receive a potentiometer shaft 193. For example, the second end 102B' of the steering shaft 102' may comprise a cutout 102D' that is configured to receive an adapter 210. The steering shaft 102' may otherwise be substantially similar to the steering shaft 102, as described herein. The potentiometer shaft 193 comprises a flattened portion 193A, and the adapter 210 comprises a ring portion 210A that fits over the potentiometer shaft 193 and engages with the flattened portion 193A to prevent rotation of the adapter 210 relative to the potentiometer shaft 193. The adapter 210 further comprises an extension 210B that engages the cutout 102D' formed in the second end 102B' of the steering shaft 102'. When the operator rotates the control handle 90 about the steering axis $A_3$, the steering shaft 102' also rotates, and engagement between the cutout 102D' formed in the second end 102B' of the steering shaft 102' and the extension 210B of the adapter 210 causes the potentiometer shaft 193 to rotate, such that rotation of the steering shaft 102' is translated to rotation of the potentiometer shaft 193. Sensor elements (not shown) of the potentiometer determine the steering angle based on rotation of the potentiometer shaft 193.

Figure 10:
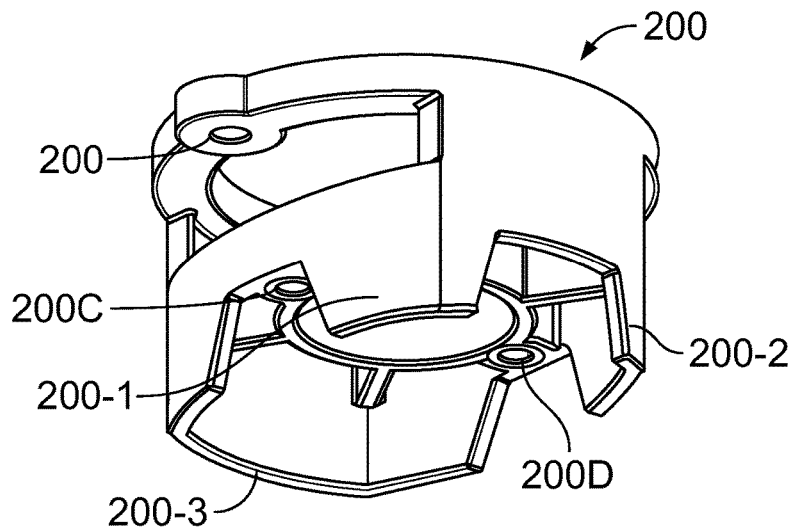
FIG. 10 is a perspective view of a sensor housing, in accordance with the present disclosure.

The steering angle sensor 192 may be coupled directly to the steer housing (not shown in FIGS. 10 and 12; see FIGS. 4A and 4B). For example, with reference to FIGS. 4B, 10, and 12, fasteners (not shown; e.g., fasteners 206, 208) may extend through apertures 192A, 192B and be received in the threaded openings 106C, 106D formed in the steer housing 106. The adapter 210 is placed over the potentiometer shaft 193 prior to coupling of the steering angle sensor 192 to the steer housing 106, and the potentiometer shaft 193 is received in the second end 102B' of the steering shaft 102', such that the extension 210B of the adapter 210 engages the cutout 102D' formed in the second end 102B' of the steering shaft 102'.

Figure 13:
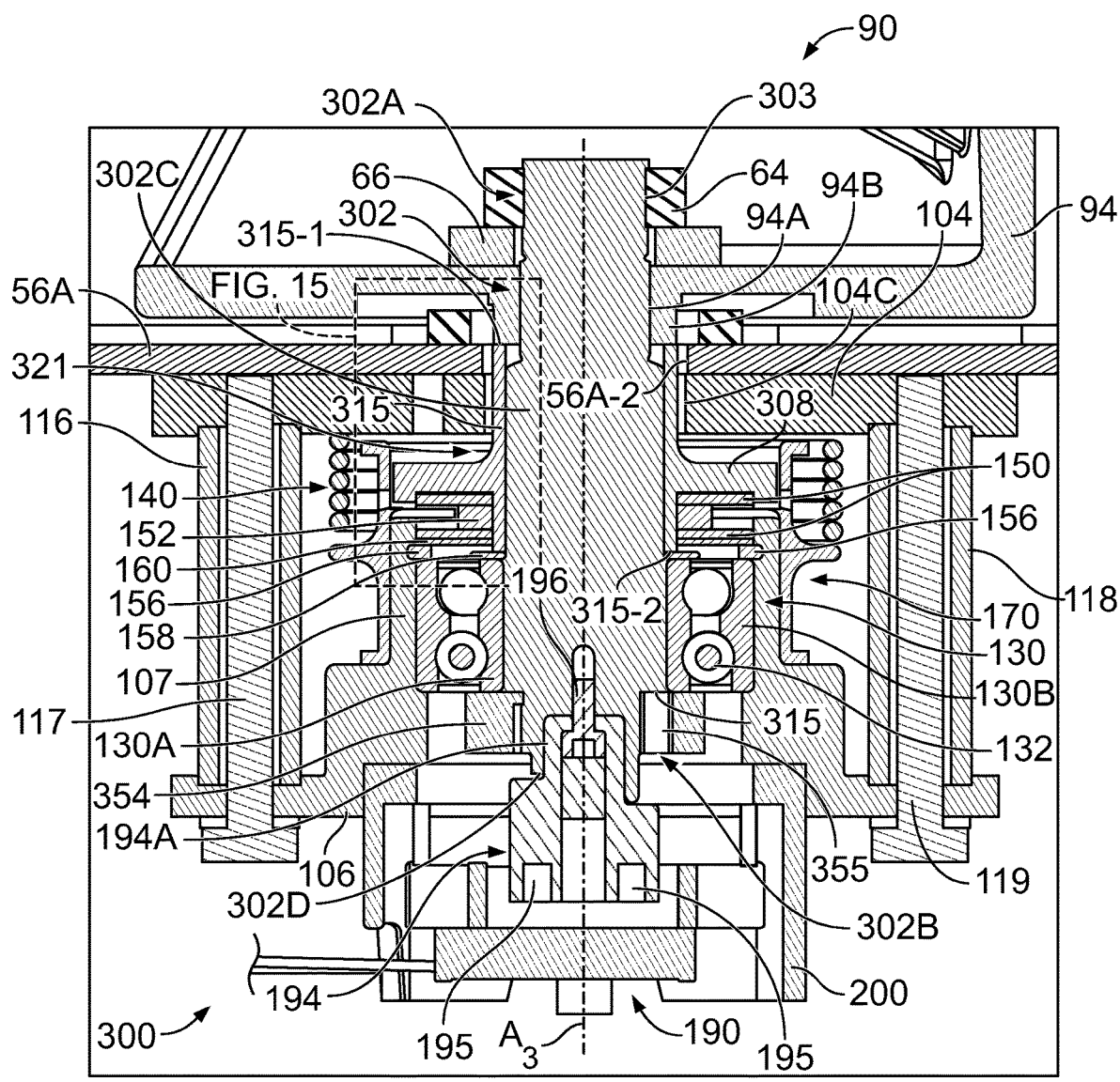
FIG. 13 is a view, partially in cross section, of a control handle and a steering shaft assembly, in accordance with the present disclosure.

FIGS. 13-16 illustrate another example of a steering shaft assembly 300 comprising a steering shaft 302, in accordance with the present disclosure, in which FIG. 13 is a cross-sectional view similar to FIG. 4A of the control handle 90 and the steering shaft assembly 300. The steering shaft assembly 300 may be part of a steering assembly that includes the steering control device (not shown in FIGS. 13-16; see FIGS. 1 and 2), which includes the control handle 90. With reference to FIG. 13, the steering shaft assembly 300 is coupled to the steering column plate 56A via bolts (not shown in FIG. 13; see FIG. 4B) that couple the adapter plate 104 of the steering shaft assembly 300 to the steering column plate 56A. The steering shaft 302 of the steering shaft assembly 300 is secured, e.g., fixedly coupled, to the base 94 of the control handle 90, such that the control handle 90 and the steering shaft 302 rotate together. The steering shaft assembly 300 further comprises a steer housing 106 spaced apart from and secured to the adapter plate 104 by standoffs 116, 118 and fasteners 117, 119; a bearing 130; a biasing member 140 in the form of a coiled spring; at least one of a friction disc 150 or a spring disc 152; and a spacer 170, all of which are substantially similar to the corresponding elements shown in FIGS. 4A, 4B, 5, 6A, and 6B, and described herein. The steer housing 106 comprises a boss 107 extending toward the adapter plate 104, and the bearing 130 is secured within the boss 107 to prevent axial movement of the bearing 130, e.g., along the steering axis $A_3$, with respect to the steer housing 106. The steering shaft 302 is coupled to the bearing 130 to allow rotation about the steering axis $A_3$.

Figure 14:
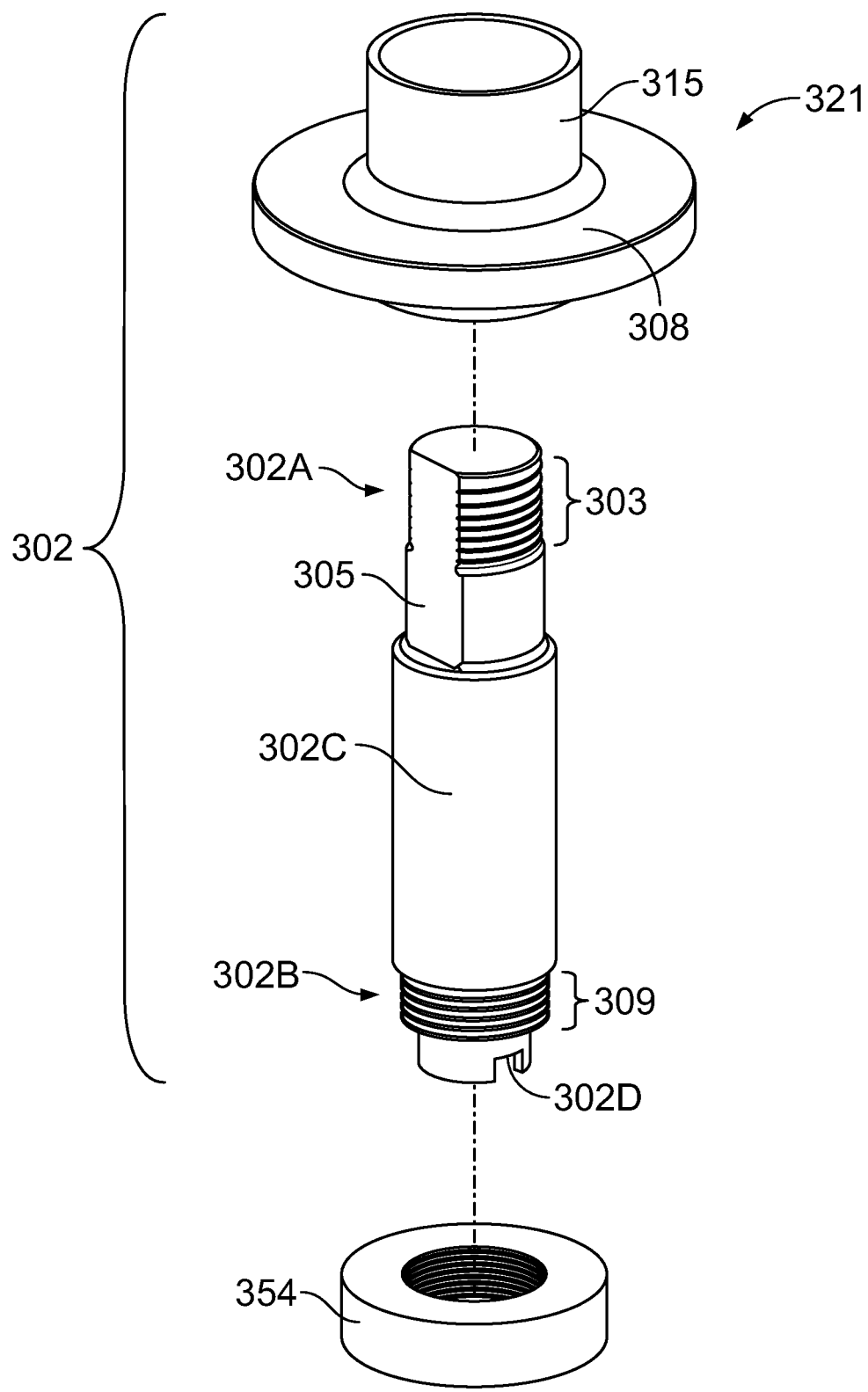
FIG. 14 is an exploded view of the steering shaft of the steering shaft assembly of FIG. 13.

With reference to FIGS. 13 and 14, the steering shaft 302 comprises a first end 302A, a second end 302B, and a main body 302C. A separate shouldered element 321 comprising a shoulder 308 is fitted over the main body 302C of the steering shaft 302. The first end 302A of the steering shaft 302 may comprise a threaded portion 303 and is adapted to be secured, e.g., fixedly coupled, to the control handle 90. The first end 302A of the steering shaft 302 may extend through the opening 104C formed in the adapter plate 104 and through the openings 56A-2, 94A formed in the steering column plate 56A and the base 94, respectively, with the first end 302A being secured to the base 94 by engagement between the threaded portion 303 and a first fastener 64, such as a nut, as described herein with respect to FIGS. 4A, 4B, and 7. As described herein, an upper section 315-1 of the shouldered element 321 supports the sleeve 94B of the base 94 of the control handle 90. A washer 66 may be positioned between the first fastener 64 and the base 94. The first end 302A of the steering shaft 302 may comprise a flattened portion 305, and the opening 94A formed in the base 94 may comprise a complementary "D" shape (not shown) that engages the flattened portion 305, such that rotation of the control handle 90 about the steering axis $A_3$ causes rotation of the steering shaft 302 about the steering axis $A_3$.

Figure 16:
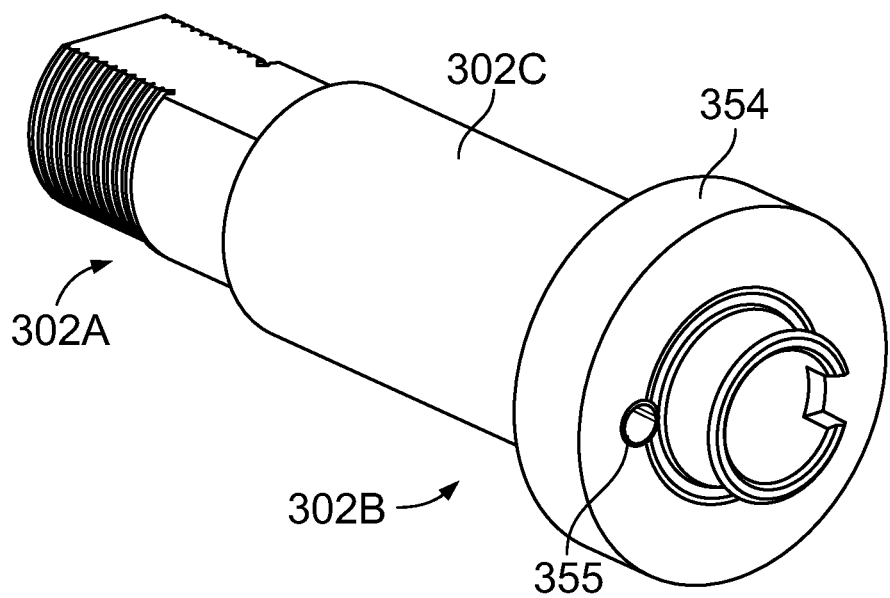
FIG. 16 is a perspective view of a steering shaft, in accordance with the present disclosure.

As shown in FIGS. 13, 14, and 16, the second end 302B of the steering shaft 302 extends into the boss 107 of the steer housing 106 and may comprise a threaded portion 309 that is configured to receive a second fastener 354. In the example shown, the second fastener 354 comprises a threaded retaining ring that engages with the threaded portion 309 of the second end 302B of the steering shaft 302. After installation of the second fastener 354 onto the second end 302B of the steering shaft 302, a roll pin 355 may be inserted into the second fastener 354 to prevent detachment of the second fastener 354 from the steering shaft 302, as shown in FIGS. 14 and 16 and described herein. In another example (not shown), instead of a separate fastener 354, the steering shaft 302 may comprise an integral step having a same general shape and location as the second fastener 354, e.g., the main body 302C of the steering shaft 302 may be manufactured as a one-piece element comprising the step.

Figure 15:
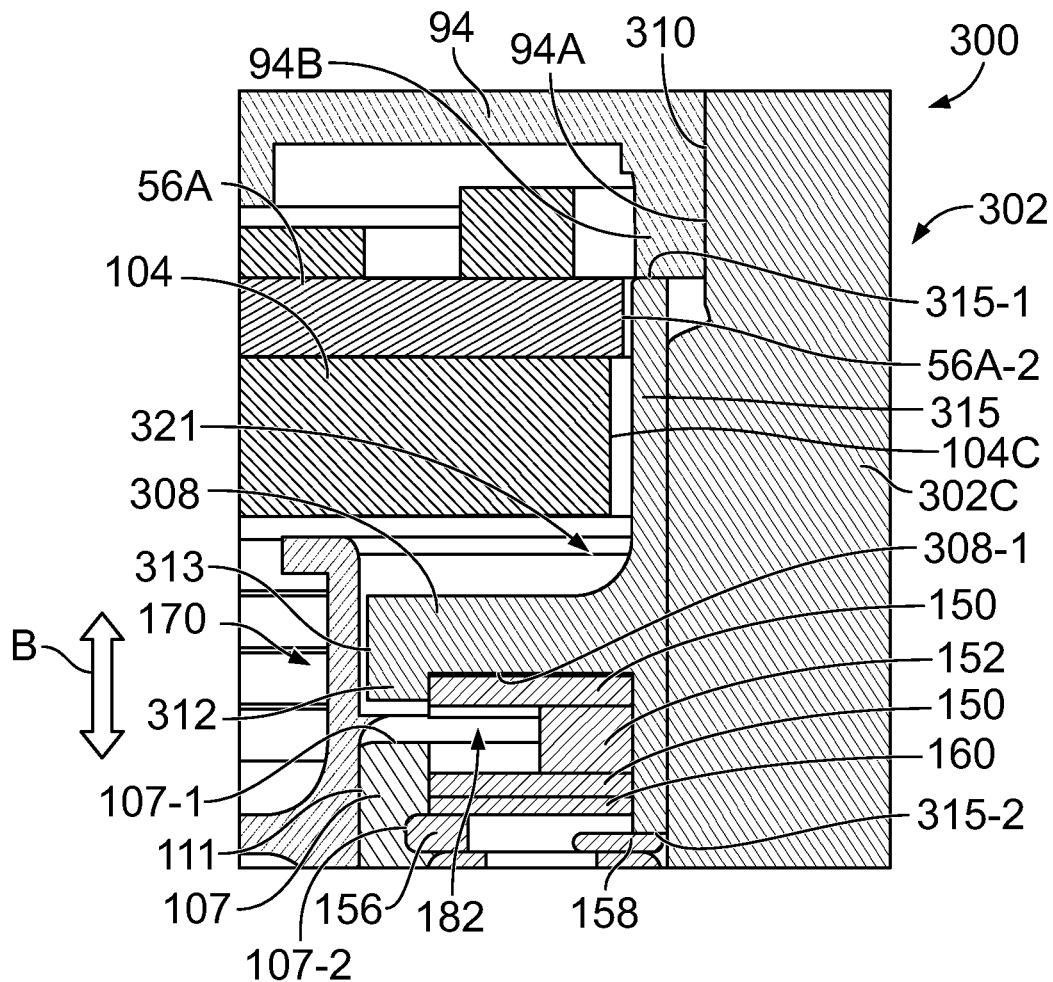
FIG. 15 is an enlarged view of a portion of the steering shaft assembly indicated in FIG. 13.

With reference to FIG. 15, the shoulder 308 extends outwardly and away from an outer surface 310 of the main body 302C of the steering shaft 302 and is positioned between the adapter plate 104 and the upper surface 107-1 of the boss 107. An outer surface 313 of the shoulder 308 may be aligned with, or located inwardly with respect to, the outer surface 111 of the boss 107. The shoulder 308 may extend outwardly at about a 90 degree angle (±5 degrees) with respect to the outer surface 310 of the main body 302C of the steering shaft 302, i.e., substantially perpendicular to the outer surface 310, as shown in FIG. 15. In other examples (not shown), the shoulder 308 may extend outwardly at about a 45 degree angle or any other angle between 45-90 degrees with respect to the outer surface 310, either toward the adapter plate 104 or toward the steer housing 106. The shoulder 308 comprises an optional lip 312 formed on a lower surface 308-1 of the shoulder 308 and extending toward the upper surface 107-1 of the boss 107.

In the example shown in FIG. 15, the shoulder 308 is coupled to, e.g., integral with, a collar 315 to define the shouldered element 321 that is separate from the main body 302C of the steering shaft 302. Manufacture of the main body 302C and the shouldered element 321 as separate components may allow for greater flexibility and tighter tolerances, as compared to a one-piece component. As shown in FIGS. 13 and 15, the shouldered element 321 fits around the main body 302C of the steering shaft 302, and prior to coupling of the steering shaft assembly 300 to the steering column plate 56A and the base 94, the shouldered element 321 is able to move axially along the main body 302C of the steering shaft 302 in a direction indicated by arrow B, i.e., parallel to the steering axis (not shown in FIG. 15; see FIG. 13). The upper section 315-1 of the collar 315 extends through the openings 104C, 56A-2, formed in the adapter plate 104 and the steering column plate 56A, respectively, to contact and support the sleeve 94B of the base 94, as shown in FIGS. 13 and 15. As described herein, when the steering shaft assembly 300 is coupled to the steering column plate 56A and the base 94, the steering control device (not visible in FIG. 15; see element 90) in FIG. 13), specifically the sleeve 94B of the base 94 of the control handle 90, applies a force to the upper section 315-1 of the collar 315, and a lower section 315-2 of the collar 315 contacts the thrust washer 158, thereby placing the shouldered element 321 under compression and clamping the base 94 between the shouldered element 321 and the first fastener 64.

With reference to FIGS. 13 and 15, the bearing 130 may be secured within the boss 107 between the snap ring 156 that is received in the recess 107-2 formed in the boss 107 and the support shoulder (not labeled in FIG. 13; see FIG. 6A) of the steer housing 106, such that the bearing 130 is secured within the boss 107 and axial movement of the bearing 130 along the steering axis $A_3$ is prevented, as described herein with respect to FIGS. 4A, 4B, 5, and 6A. The thrust washer 158 is received between the upper surface (not labeled) of the bearing 130 and the lower section 315-2 of the collar 315, which supports an axial load of the shouldered element 321.

The bearing 130 may comprise an inner race 130A and an outer race 130B with ball bearings 132 positioned therebetween that allow the inner race 130A to rotate relative to the outer race 130B. The outer race 130B may be secured within the boss 107, e.g., via a friction fit. The steering shaft 302 may be coupled to the bearing 130 by a friction fit between the outer surface 310 of an adjacent portion of the main body 302C of the steering shaft 302 and an inner surface (not labeled) of the bearing 130, specifically the inner surface of the inner race 130A as described herein, such that the steering shaft 302 and the inner race 130A of the bearing 130 rotate together about the steering axis $A_3$. Also as described herein, coupling of the steering shaft assembly 300 to the steering control device, specifically coupling together of the steering shaft 302, the base 94 of the control handle 90, the shouldered element 321, and the bearing 130, comprises coupling the first and second fasteners 64, 354 to the respective threaded portions 303, 309 of the first and second ends 302A, 302B of the steering shaft 302. The one or more friction discs 150 and/or one or more spring discs 152 are positioned about the steering shaft 302 between the shoulder 308 and the bearing 130, as shown in FIG. 13. The lip 312 of the shoulder 308 may help to maintain the correct positioning of the friction disc(s) 150 and/or the spring disc(s) 152 about the steering shaft 302.

As shown in FIG. 13, the spacer 170 is positioned about the outer surface 111 of the boss 107 and the outer surface 313 of the shoulder 308. As described above with respect to the steering shaft assembly 100, the spacer 170 is configured to prevent condensation from entering a cavity 182 defined between the shoulder 308 and the boss 107. Also as described above, the biasing member 140 may comprise, for example, a coiled spring that is positioned about the boss 107, specifically, about an outer surface (not labeled) of the spacer 170, with the spacer 170 helping to properly position the biasing member 140. The biasing member 140 helps to return the control handle 90 to the home position and also helps to contribute to a net steering resistance.

As described herein with respect to the steering shaft assembly 100, the steering shaft assembly 300 shown in FIG. 13 provides a simpler steering system that provides a constant, mechanical steering resistance with fewer components. In addition, the spacer 170 helps to redirect condensation entering the steering shaft assembly 300 and helps to properly position the biasing member 140 axially, i.e., along the steering axis $A_3$.

The following provides an exemplary method of assembling the steering shaft assembly 300 shown in FIGS. 13 and 15. Assembly may begin by installing the bearing 130 and the snap ring 156 into the steer housing 106, as described above with respect to the steering shaft assembly 100. The second fastener 354 comprising the retaining ring is threaded onto the second end 302B of the steering shaft 302, after which a hole or bore (not labeled) is drilled through the retaining ring 354. The hole extends axially through an adjacent portion of the threads in the threaded portion 309 formed on the second end 302B of the steering shaft 302 but does not extend into the main body 302C of the steering shaft 302. The roll pin 355 is then inserted into the hole to permanently fix the retaining ring 354 to the second end 302B of the steering shaft 302 and to prevent disengagement of the retaining ring 354 from the second end 302B of the steering shaft 302. The steering shaft 302 is press fit into the bearing 130 by introducing the first end 302A of the steering shaft 302 into the bottom of the bearing 130 and pressing the steering shaft 302 into the bearing 130 until the retaining ring 354 contacts a bottom surface of the bearing 130. The thrust washers 158, 160, friction discs 150, and spring disc 152 are installed over the first end 302A of the steering shaft 302 in the order shown in FIGS. 13 and 15. The spacer 170 is installed over the boss 107, and the shouldered element 321 is placed over the first end 302A of the steering shaft 302, such that the friction discs 150 and spring disc 152 are sandwiched between the shouldered element 321 and the second thrust washer 160. The biasing member 140 may be positioned about the spacer 170 before or after the shouldered element 321 is installed onto the steering shaft 302. The adapter plate 104 and the steer housing 106 are secured together via the standoffs 116, 118, the fasteners 117, 119, and the washers 117A, 119A. The steering shaft assembly 300 is coupled to the steering column plate 56A via the bolts 101 that pass through the openings 56A-1 in the steering column plate 56A and are threadedly received in the threaded openings 104D in the adapter plate 104. The steering shaft assembly 300 and the steering column plate 56A are coupled to the base 94 of the control handle 90 via the first fastener 64 and washer 66, as described above with respect to the steering shaft assembly 100.

Coupling of the steering shaft assembly 300 to the steering control device, i.e., the control handle 90, specifically coupling the first fastener 64 to the first end 302A of the steering shaft 302, causes the base 94 of the control handle 90 to contact the upper section 315-1 of the collar 315 of the shouldered element 321. The shouldered element 321 moves downward in the direction indicated by arrow B in FIG. 15 until the lower section 315-2 contacts the thrust washer 158 and a clamp load is applied between the first fastener 64 and the second fastener 354, i.e., a clamp load is applied by the first and second fasteners 64, 354 to the sleeve 94B of the base 94, the collar 315 of the shouldered element 321, the thrust washer 158, and the bearing 130. Upon application of the clamp load, the steering shaft 302 is secured, e.g., fixedly coupled, to the base 94 of the control handle 90, such that a relative motion of the base 94, the steering shaft 302, and the shouldered element 321 is maintained and the control handle 90 and the steering shaft 302 rotate together. The shoulder 308 exerts a load on the friction disc(s) 150 and/or spring disc(s) 152 and compresses the spring disc(s) 152, such that the friction disc(s) 150 and/or spring disc(s) 152 provide a constant steering resistance upon rotation of the steering shaft 302 about the steering axis $A_3$. The steering resistance is set by a distance between the lower surface 308-1 of the shoulder 308 and the second thrust washer 160.

As shown in FIG. 13, a steering angle sensor 190 is associated with the second end 302B of the steering shaft 302. As described herein with respect to FIGS. 4A, 4B, 5, 9, and 11, the steering angle sensor 190 is configured to detect angular displacement of the steering shaft 302 about the steering axis $A_3$, and the angular position of the steering shaft 302 corresponds to the angular position of the control handle 90. In the example shown in FIG. 13, the steering angle sensor 190 comprises a Hall-effect sensor, and the second end 302B of the steering shaft 302 is configured to receive a sensor assembly 194 comprising a magnetic material 195. The second end 102B of the steering shaft 302 may comprise a notch 302D (see also FIG. 14) that is configured to receive a tab 194A formed on the sensor assembly 194, and the sensor assembly 194 may be coupled to the second end 302B of the steering shaft 302 via a fastener 196. The steering shaft assembly 300 may further comprise a sensor housing 200 secured to the steer housing 106 and configured to receive the steering angle sensor 190, as shown in FIG. 13 and as described herein with respect to FIGS. 4A, 4B, 5, and 10. The steering angle sensor 190 (including the Hall-Effect sensor and the potentiometer) and the sensor housing 200 may be installed as described above with respect to the steering shaft assembly 100. Although not shown, the steering angle sensor may comprise a potentiometer, as described herein with respect to FIGS. 11 and 12.

With reference to FIGS. 2 and 17, the steer motor 120 comprises a position sensor 126. As the steer motor output shaft 123 and drive gear 122 rotate, the position sensor 126 generates a steer motor position signal to the steering control module 420, which signal is indicative of an angular position of the steerable wheel 74 and the speed of rotation of the steerable wheel 74 about the first axis $A_3$. The steering control module 420 calculates from the steer motor position signal a current actual angular position of the steerable wheel 74 and the current speed of rotation of the steerable wheel 74 about the first axis $A_3$. The steering control module 420) passes the calculated current angular position of the steerable wheel 74 and the current speed of rotation of the steerable wheel 74 to the display module 430.

The steering control module 420 also receives the steer control signal from the steering angle sensor 190, 192, which, as noted above, senses the angular position of the control handle 90 within the angular range of approximately +/−60 degrees in the illustrated example. The steering control module 420 passes the steer control signal to the display module 430. Since a current steer control signal corresponds to a current position of the control handle 90 falling within the range of from about +/−60 degrees and the steerable wheel 74 is capable of rotating through an angular range of +/−90 degrees, the display module 430 converts the current control handle position, as indicated by the steer control signal, to a corresponding desired angular position of the steerable wheel 74 by multiplying the current control handle position by a ratio of equal to or about 90/60 in the illustrated embodiment, e.g., an angular position of the control handle 90 of +60 degrees equals a desired angular position of the steerable wheel 74 of +90 degrees. The display module 430 further determines a steer rate, i.e., change in angular position of the control handle 90 per unit time, using the steer control signal. For example, the display module 430 may compare angular positions of the control handle 90 determined every 32 milliseconds to determine the steer rate.

As noted above, the proximity sensor 36 generates an operator status signal indicating that either an operator is standing on the floorboard 34 in the operator's compartment 30 or no operator is standing on the floorboard 34 in the operator's compartment 30. The proximity sensor 36 is coupled to the traction control module 410 such that the traction control module 410 receives the operator status signal from the proximity sensor 36. The traction control module 410 forwards the operator status signal to the display module 430. If an operator is standing on the floorboard 34 in the operator's compartment 30, as indicated by the operator status signal, the display module 430 will allow movement of the steerable wheel 74 to an angular position falling within a first angular range, which, in the illustrated embodiment, is equal to approximately +/−90 degrees. If, however, an operator is NOT standing on the floorboard 34 in the operator's compartment 30, the display module 430) will limit movement of the steerable wheel 74 to an angular position within a second angular range, which, in the illustrated embodiment, is equal to approximately +/−15 degrees. It is noted that when an operator is standing on the floorboard 34 in the operator's compartment 30, the pallet truck 10 is being operated in a rider mode, such as the high speed or the low speed mode noted above. When an operator is NOT standing on the floorboard 34 in the operator's compartment 30, the pallet truck 10 may be operated in the "walkie" mode, where the operator walks alongside the pallet truck 10 while gripping and maneuvering the control handle 90 and one of the first and second rotatable speed control elements 96A and 96B. Hence, rotation of the steerable wheel 74 is limited during the walkie mode to an angular position within the second angular range.

As noted above, the steering control module 420 passes the calculated current angular position of the steerable wheel 74 and the current speed of rotation of the steerable wheel 74 to the display module 430. The steering control module 420 further passes the steer control signal to the display module 430, which then converts the steer control signal to a corresponding requested or desired angular position of the steerable wheel 74. If an operator is standing on the floorboard 34 in the operator's compartment 30, as detected by the proximity sensor 36, the display module 430 forwards the requested angular position for the steerable wheel 74 to the steering control module 420, which generates a first drive signal to the steer motor 120 causing the steer motor 120 to move the steerable wheel 74 to the requested angular position. If an operator is NOT standing on the floorboard 34 in the operator's compartment 30), as detected by the proximity sensor 36, the display module 430 will determine if the requested angular position for the steerable wheel 74 is within the second angular range, noted above. If so, the display module 430 forwards the requested angular position for the steerable wheel 74 to the steering control module 420, which generates a first signal to the steer motor 120 causing the steer motor 120 to move the steerable wheel 74 to the requested angular position. If the requested angular position for the steerable wheel 74 is NOT within the second angular range, the display module 430 limits the angular position for the steerable wheel 74 forwarded to the steering control module 420 to the appropriate extreme or outer limit of the second angular range.

As noted above, the encoder 73 is coupled to the output shaft (not shown) of the traction motor 72 to generate signals indicative of the speed and direction of rotation of the traction motor 72. The encoder signals are provided to the traction control module 410, which determines the direction and speed of rotation of the traction motor 72 from those signals. The traction control module 410 then forwards traction motor rotation speed and direction information to the display module 430. This information corresponds to the direction and speed of rotation of the steerable wheel 74 about the second axis $A_2$.

While particular examples of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of the present disclosure.

What is claimed is:

1. A steering shaft assembly comprising:
   an adapter plate;
   a steer housing spaced apart from and secured to the adapter plate, the steer housing comprising a boss extending toward the adapter plate;
   a bearing secured within the boss to prevent axial movement of the bearing;
   a steering shaft coupled to the bearing to allow rotation about a steering axis, the steering shaft comprising a first end, a main body, and a shoulder, wherein the first end extends through an opening in the adapter plate and is adapted to be secured to a steering control device, and wherein the shoulder extends outwardly from an outer surface of the main body and is positioned between the adapter plate and an upper surface of the boss; and
   at least one of a friction disc or a spring disc positioned about the steering shaft between the shoulder and the bearing, wherein the shoulder and the bearing exert a load on the at least one friction disc or spring disc, and wherein the at least one friction disc or spring disc provides a constant steering resistance upon rotation of the steering shaft about the steering axis.

2. The steering shaft assembly of claim 1, wherein the at least one friction disc or spring disc comprises a first friction disc, a second friction disc, and a spring disc, wherein the spring disc is positioned between the first and second friction discs, wherein the shoulder and the bearing compress the first and second friction discs and the spring disc to provide the constant steering resistance.

3. The steering shaft assembly of claim 1, wherein the shoulder is fixedly coupled to the main body of the steering shaft.

4. The steering shaft assembly of claim 1, further comprising:
a steering angle sensor associated with a second end of the steering shaft, the steering angle sensor being configured to detect angular displacement of the steering shaft about the steering axis.

5. The steering shaft assembly of claim 4, wherein the second end of the steering shaft is configured to receive a sensor assembly comprising a magnetic material, and wherein the steering angle sensor comprises a Hall-effect sensor configured to determine a steering angle based on sensing of a magnetic field generated by the magnetic material as the steering shaft rotates about the steering axis, wherein the steering shaft assembly further comprises a sensor housing secured to the steer housing and configured to receive the Hall-effect sensor.

6. The steering shaft assembly of claim 4, wherein the steering angle sensor comprises a potentiometer.

7. The steering shaft assembly of claim 1, wherein the steering shaft is coupled to the bearing by a friction fit between the outer surface of the steering shaft and an inner surface of the bearing.

8. The steering shaft assembly of claim 1, wherein a second end of the steering shaft comprises a threaded portion configured to receive a fastener, wherein the steering shaft is coupled to the bearing by a clamp load applied between the fastener and a retention shoulder formed on the steering shaft when the second end of the steering shaft extends through the bearing and the threaded portion is coupled to the fastener.

9. A steering assembly comprising:
a steering control device; and
a steering shaft assembly, the steering shaft assembly comprising:
an adapter plate;
a steer housing spaced apart from and secured to the adapter plate, the steer housing comprising a boss extending toward the adapter plate;
a bearing secured within the boss to prevent axial movement of the bearing;
a steering shaft coupled to the bearing to allow rotation about a steering axis, the steering shaft comprising a first end and a main body, wherein the first end extends through an opening in the adapter plate and is secured to the steering control device;
a shoulder extending away from an outer surface of the main body and positioned between the adapter plate and an upper surface of the boss; and
at least one of a friction disc or spring disc positioned about the steering shaft between the shoulder and the bearing, wherein coupling the steering shaft assembly to the steering control device exerts a load on the at least one friction disc or spring disc, and wherein the at least one friction disc or spring disc provides a constant steering resistance upon rotation of the steering shaft about the steering axis.

10. The steering shaft assembly of claim 9, wherein the shoulder is coupled to a collar such that the shoulder and the collar define a shouldered element, the shouldered element being separate from and moving axially along the main body of the steering shaft.

11. The steering shaft assembly of claim 10, wherein an upper section of the collar extends through the opening in the adapter plate and the steering control device applies a force to the upper section of the collar.

12. The steering shaft assembly of claim 9, wherein the first end of the steering shaft comprises a first threaded portion and a second end of the steering shaft comprises a second threaded portion, wherein the coupling of the steering shaft assembly to the steering control device comprises coupling respective first and second fasteners to the first and second threaded portions of the steering shaft.

13. The steering shaft assembly of claim 9, further comprising:
a steering angle sensor associated with a second end of the steering shaft, the steering angle sensor being configured to detect angular displacement of the steering shaft about the steering axis.

14. A steering shaft assembly comprising:
an adapter plate;
a steer housing spaced apart from and secured to the adapter plate, the steer housing comprising a boss extending toward the adapter plate;
a steering shaft configured to rotate about a steering axis and comprising a main body, a first end and a second end, wherein the first end extends through an opening in the adapter plate, wherein the second end extends into the boss;
a shoulder extending away from an outer surface of the main body and positioned between the adapter plate and the boss, an outer surface of the shoulder being aligned with or located inwardly with respect to an outer surface of the boss; and
a spacer positioned about the outer surfaces of the boss and the shoulder, wherein condensation entering the steering shaft assembly is directed from an inner surface of the spacer to an outer surface of the spacer via a plurality of openings.

15. The steering shaft assembly of claim 14, wherein the spacer comprises an inner lip positioned between a lower surface of the shoulder and an upper surface of the boss.

16. The steering shaft assembly of claim 15, wherein the inner lip and the plurality of openings are angled downward in a direction extending away from the adapter plate.

17. The steering shaft assembly of claim 15, wherein the plurality of openings are positioned above the inner lip such that the condensation is prevented from entering a cavity defined between the shoulder and the boss.

18. The steering shaft assembly of claim 14, wherein the spacer further comprises an outer lip and the steering shaft assembly further comprises a biasing member positioned about the outer surface of the spacer between the adapter plate and the outer lip of the spacer, wherein the biasing member biases the steering shaft toward a home position.

* * * * *